US012745278B2

(12) United States Patent
Hellwig

(10) Patent No.: US 12,745,278 B2
(45) Date of Patent: Sep. 22, 2026

(54) SPECTRUM LEASE EXCHANGE AND MANAGEMENT SYSTEMS AND METHODS

(71) Applicant: CHESAPEAKE TECHNOLOGY INTERNATIONAL CORPORATION, California, MD (US)

(72) Inventor: Dustan Christopher Hellwig, California, MD (US)

(73) Assignee: CHESAPEAKE TECHNOLOGY INTERNATIONAL CORPORATION, California, MD (US)

( * ) Notice: Subject to any disclaimer, the term of this patent is extended or adjusted under 35 U.S.C. 154(b) by 385 days.

(21) Appl. No.: 18/342,436

(22) Filed: Jun. 27, 2023

(65) Prior Publication Data

US 2024/0032084 A1 Jan. 25, 2024

Related U.S. Application Data

(60) Provisional application No. 63/355,749, filed on Jun. 27, 2022.

(51) Int. Cl.
*H04W 72/543* (2023.01)
*H04W 72/0453* (2023.01)

(52) U.S. Cl.
CPC ..... *H04W 72/543* (2023.01); *H04W 72/0453* (2013.01)

(58) Field of Classification Search
CPC ....................... H04W 72/543; H04W 72/0453; H04W 16/14
See application file for complete search history.

(56) References Cited

U.S. PATENT DOCUMENTS 8,521,636 B2 8/2013 Chang
10,575,185 B2 2/2020 Li
2010/0105400 A1 4/2010 Palmer
2011/0055070 A1 3/2011 Stanforth
2016/0198360 A1* 7/2016 Smith ............... H04W 28/0289 370/237
2016/0328120 A1* 11/2016 Smith ................... H04W 72/53
2017/0287085 A1* 10/2017 Smith ................... G01S 5/0244

* cited by examiner

*Primary Examiner* — Jae Y Lee
*Assistant Examiner* — Nick Anon Sundara
(74) *Attorney, Agent, or Firm* — RAPHAEL BELLUM PLLC

(57) ABSTRACT

Systems, methods and devices for allocating spectrum within a radio frequency system are provided. A spectrum optimization server receives from a lease management server information associated with a request for leasing radio frequency spectrum to a first lessee. The request can include a first indicator of quality. The spectrum optimization server can identify a first allocation of spectrum for the first lessee based on the first indicator of desired quality and a predicted quality of the first allocation of spectrum. The spectrum optimization server can transmit an indicator that the first lessee is granted access to the first allocation of spectrum. The spectrum optimization server can receive from a first spectrum sensing device information associated with at least one measure quality characteristic of the first allocation of spectrum. The spectrum optimization server can transmit to the lease management server an indication of measured quality of the first allocation of spectrum.

13 Claims, 6 Drawing Sheets

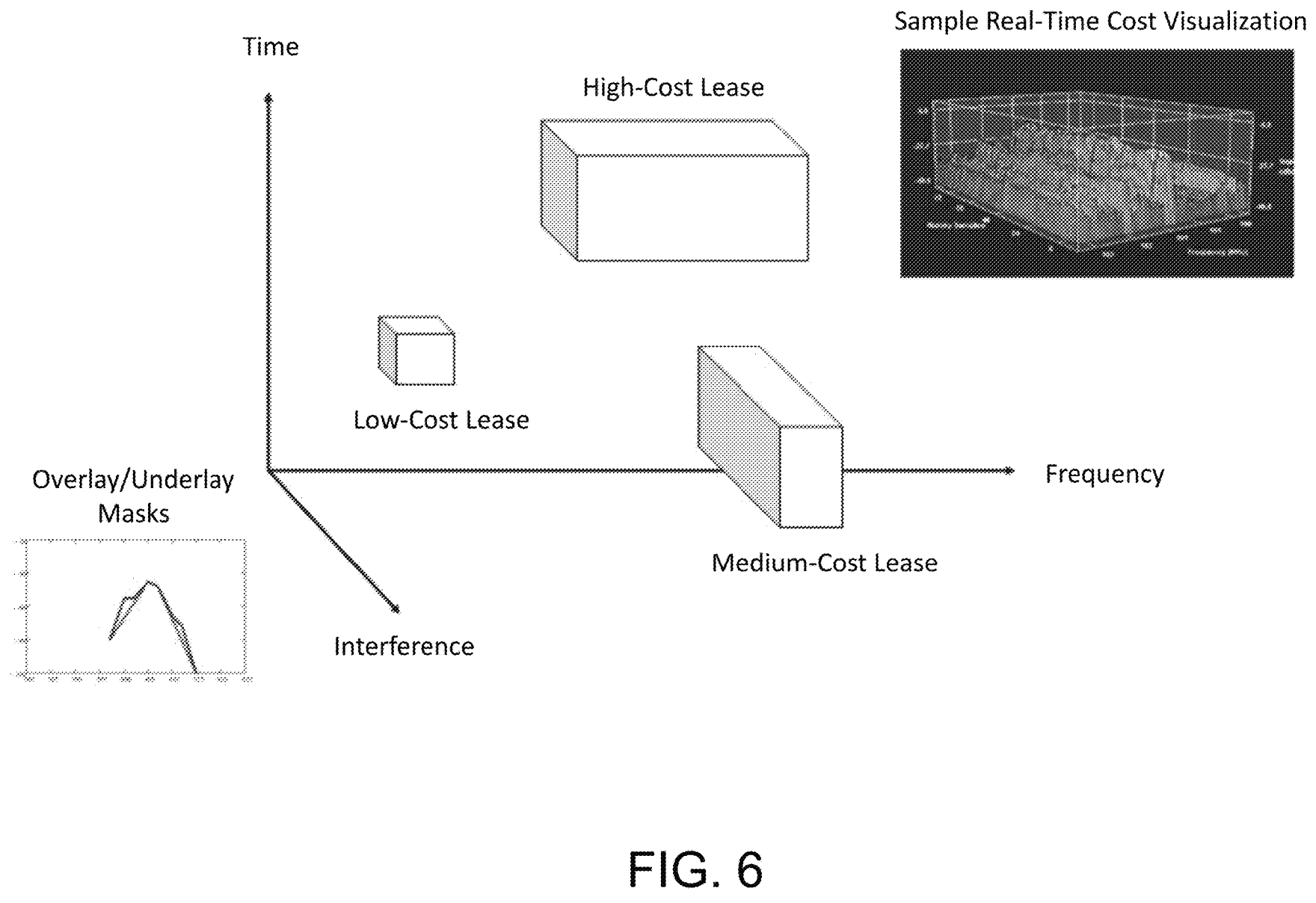

Sample Real-Time Cost Visualization

High-Cost Lease

Low-Cost Lease

Medium-Cost Lease

Frequency

Time

Interference

Overlay/Underlay Masks

FIG. 6

SPECTRUM LEASE EXCHANGE AND MANAGEMENT SYSTEMS AND METHODS

CROSS-REFERENCE TO RELATED APPLICATION

This application claims benefit of priority to U.S. provisional application No. 63/355,749 filed on Jun. 27, 2022. The provisional application and all other documents cited in the present application are incorporated by reference in their entirety.

TECHNICAL FIELD

The technology of this application relates to radio frequency spectrum sharing systems and methods, in particular to spectrum sharing systems and methods for dynamically optimizing utilization of leased radio frequency spectrum based on a predicted quality of spectrum to be allocated and a measured quality of allocated spectrum.

BACKGROUND

Radio frequency spectrum is a valuable and limited resource that can be used across a wide range of applications, including mobile telecommunications, broadcast services, satellite communications, and various other non-mobile technologies such as military, radar, medical, and event productions. The increasing demand for wireless services, coupled with the widespread use of wireless devices and applications, has led to a scarcity of available spectrum.

As the demand for spectrum continues to increase, the efficient utilization of available spectrum becomes more and more important. In particular, shared utilization of licensed spectrum improves overall operations and provides additional capacity for the users who require more spectrum. A wide range of spectrum sharing schemes can facilitate and maximize the use of particular frequency bands (including licensed and unlicensed bands) belonging to various service providers. The deployment of spectrum sharing is subject to regulatory and compliance requirements, and can also involve various coordination protocols and techniques.

Spectrum leasing is one approach used to address the inefficiencies of static spectrum allocation. Spectrum leasing involves the temporary transfer of radio frequency usage rights from the licensed spectrum holder (lessor) to another entity (lessee) for a specified period of time and under specific conditions. This arrangement allows underutilized or unused spectrum to be made available to entities with varying spectrum requirements, fostering more efficient spectrum utilization.

Spectrum sharing takes many forms, ranging from simple geographic separation to sophisticated dynamic systems. Spectrum sharing systems and processes attempt to overcome the complexities of propagation-modeling, frequency management, disparate use cases, unclear roles and workability of spectrum sensing, database and other security concerns, and the need for effective enforcement mechanisms.

Current capabilities and approaches to spectrum sharing fail, however, because they are too static, do not respond to real-time conditions, and are not informed by active sensing and awareness. Those approaches do not provide an operational depiction of the spectrum environment sufficient to inform proper decision-making and management. Commercial industry has developed some solutions for wireless, cellular, and other monetized spectrum environments, but these are narrowly focused. And although the Department of Defense (DOD) has several spectrum management solutions such as SPEED (Systems Planning Engineering & Evaluation Device), CJSMPT (Coalition Joint Spectrum Management and Planning Tool), and AESOP (Afloat Electromagnetic Spectrum Operations Program), those tools are mostly for communications planning and RF propagation analysis tools, rather than dynamic spectrum allocation.

The problem of spectrum scarcity often results from the inefficiency of traditional static spectrum allocation policies. These inefficiencies have led to three general types of proposals for increasing dynamic spectrum access: (1) open sharing; (2) hierarchical access; and (3) dynamic exclusive use. Open sharing involves a model similar to industrial, science, and medicine (ISM) bands, in which each peer network accesses the same spectrum with equal probability. Open sharing provides equal rights to each user network to access the spectrum, and there is no interference constraint from one network to its neighbors. Hierarchical spectrum access, by contrast, attempts to improve spectrum access in current allocations by using a primary network (user) and a secondary network (user). The secondary user accesses the spectrum without affecting the primary user. In some hierarchical spectrum access systems, concurrent primary and secondary system transmissions occur only when the interference generated by the secondary network at the primary network is below some acceptable threshold. In others, secondary users can simultaneously transmit if they use part of their power to relay the primary user's message. Finally, the dynamic exclusive use approach provides the right to sell or trade the spectrum to third-party licensees (e.g., secondary users). However, dynamic exclusive use systems have not been able to actively adapt the interference cap (maximum amount of interference tolerated) to the required quality of service, and the technique remains very inefficient with high numbers of under-utilized portions of spectrum or too much interference to achieve the required quality of service.

Additionally, most of the current spectrum allocation process is manual, time-consuming, and error-prone due to the extensive use of outdated reference data, lack of real-time awareness, and the use of advertised capabilities rather than observed performance. Current spectrum sampling also suffers from being narrowband, inconsistent in time and space, and not persistently stored and shared to inform deeper analyses.

The U.S. Government's sell-off of spectrum to commercial providers for telecommunications, data, and other services, has impacted operations at DOD ranges, facilities, and Continental United States (CONUS) based operations as a result of reduction in available spectrum, the potential interference by these commercial providers, and the continued lack of flexibility in the current spectrum management system. The current approach by which spectrum is allocated, used, shared, optimized, and accessed has failed to keep pace with emerging challenges. Any improvements to date have not adequately addressed web-based spectrum access in a manner that efficiently deconflicts spectrum assignments and allocation in support of CONUS test and evaluation (T&E), experimentation, exercises, and operations.

SUMMARY

The invention includes systems and methods for spectrum sub-lease or micro-lease management and enforcement with advanced spectrum visualization, spectrum allocation optimization, real-time sharing infrastructure, spectrum monitoring, and data management. This invention aims to optimize the utilization of limited spectrum resources while allowing lease holders to generate revenue by sub-leasing portions of the spectrum to other users. The proposed enforcement regime ensures reliable access to the sub-leased spectrum, maintains quality, prevents interference, and includes a mechanism for compensating lessors when these requirements are not met. The invention provides several technical solutions to many of the problems of prior systems.

Dynamic Optimization Based on Combination of Predicted Spectrum Quality and Measured Spectrum Quality Prior systems allocated spectrum based solely on predicted spectrum quality. As a result, when the quality of the allocated spectrum fell below the predicted spectrum quality during usage of the allocated spectrum, this resulted in a deterioration of overall experience and performance without any recourse for the lessee. Omitting feedback or confirmation that the actual quality of the allocated spectrum experienced during usage matched the predicted quality resulted in billing a lessee for spectrum that it was unable to utilize effectively due to the degradation in quality of the real-time usage. Moreover, static systems could not change spectrum allocations after a determination based on predicted quality was performed.

By combining predictive modeling and real-time measurements, dynamic optimization enables more accurate and efficient spectrum allocation, resulting in improved spectrum utilization and enhanced user experience. Predictive modeling techniques, such as machine learning algorithms, can be employed to estimate the quality of spectrum available for allocation. Some factors that may be considered in prediction models include historical data, environmental conditions, interference sources, user behavior patterns, and rogue devices (e.g., devices that are not authorized to transmit or receive within a specific spectrum). Predicted spectrum quality provides an initial assessment of the suitability of a spectrum allocation for a desired application or service.

Real-time measurements and sensing techniques are then used to assess the actual quality of the spectrum allocated to a lessee. Spectrum monitoring devices and sensors collect data on signal strength, interference levels, noise levels, and other relevant signal quality parameters. Measured spectrum quality provides up-to-date and accurate information about the actual, current conditions and availability of the spectrum.

The combination of predicted spectrum quality and measured spectrum quality enables dynamic optimization of spectrum allocation. A method for analyzing the predicted and measured data can be used to determine an optimal spectrum band for leasing. The method can consider various factors such as application requirements, service priorities, available spectrum options, and regulatory constraints. Dynamic optimization allows for adaptive and real-time allocation and reallocation decisions, ensuring optimal spectrum utilization and improved user experience.

By considering both predicted and measured spectrum quality, dynamic optimization can allocate spectrum bands with higher reliability and performance, maximizing the efficiency of spectrum usage. Allocating spectrum based on accurate and up-to-date measurements leads to improved signal quality, reduced interference, and better overall service performance. Dynamic optimization enables adjustments in spectrum allocation based on changing conditions, traffic throughput, or user demands, ensuring continuous optimization and responsiveness to the evolving wireless environment. By dynamically allocating spectrum based on predicted and measured quality, the system can prioritize high-demand areas, balance load, and allocate resources where they are most needed resulting in better resource utilization throughout the system. By considering measured interference levels, the optimization process can avoid allocating spectrum bands with high interference, thereby minimizing the impact on neighboring users and improving overall network efficiency.

Real-Time Exchange for Sub-Leasing and Micro-Leasing of Spectrum

In prior systems, lessors of spectrum were unable to sublease spectrum that was directly leased from regulatory authorities, government agencies, spectrum auction administrators, or national spectrum users. That is, in prior systems, lessors were the only authorized user of the specific bands that were assigned to the lessor. If lessors did not continuously use or require the fully allocated spectrum, portions of the spectrum might have remained idle or underutilized, thus leading to inefficient spectrum usage and suboptimal allocation of resources. In a system without subleasing, lessees may face challenges in adapting spectrum resources to match evolving usage patterns and emerging technologies. The lack of flexibility can hinder innovation and limit the ability to optimize spectrum allocation. Without subleasing capabilities, opportunities for collaborative spectrum usage and sharing among different entities are significantly restricted. This may hinder cooperation, hinder development of new services, and limit the overall benefits derived from shared spectrum resources.

Subleasing also introduces market dynamics and competition into spectrum allocation. When subleasing is not allowed, the spectrum market dynamics may be dampened, as lessees have fewer options for trading or transferring spectrum rights. This lack of market-driven dynamics can result in less efficient allocation and potentially stifle innovation and competition. Spectrum demands can vary over time and across different geographic areas. Without subleasing capabilities, lessees may struggle to adjust spectrum usage according to changing demand patterns. This inflexibility can lead to underutilization of spectrum in low-demand areas and potential congestion or service degradation in high-demand areas. Without subleasing opportunities, the administrative burden of managing spectrum leases can increase, as lessees may need to go through more complex processes to adjust their spectrum holdings. This complexity can lead to inefficiencies and delays in managing spectrum resources.

The ability to have a real-time dynamic exchange of spectrum allotments using both sub-leasing and micro-leasing offers numerous technical solutions to the challenges faced by prior systems in spectrum allocation. By incorporating sub-leasing and micro-leasing, the system gains flexibility, efficiency, and improved spectrum utilization.

A sub-lease is the practice of leasing spectrum rights currently owned by an entity that directly acquired the spectrum rights from a regulatory authority, government agency, spectrum auction administrator, or national spectrum user, and then in turn leasing some or all of those rights to another entity that actually will use the spectrum rights. The original lessee, who holds the primary lease agreement with the spectrum holder, becomes a sub-lessor, while the secondary party becomes a sub-lessee. Sub-leasing allows the primary lessee to transfer, whether partially or fully, its spectrum rights to another entity, often for a specific duration or under certain conditions.

A micro-lease is the practice of re-leasing already sub-leased spectrum to yet another lessee. In previous systems, even if sub-leasing spectrum was possible, it most likely was not possible to re-lease the sub-leased spectrum to another party. That is, a sub-lessee that has acquired use of an allocation of spectrum may further lease spectrum allocated to the sub-lessee to another party (e.g., micro-lessee) before the termination of sub-lessee's contract.

Sub-leasing and micro-leasing enable real-time exchanges of spectrum allotments, allowing lessees to adjust their spectrum holdings based on changing needs and demand patterns. Lessees have the flexibility to sub-lease or micro-lease unused or excess spectrum portions, facilitating efficient resource allocation and minimizing spectrum wastage. Sub-leasing and micro-leasing enable dynamic sharing of spectrum among multiple lessees, ensuring that spectrum remains active and utilized rather than remaining idle. It maximizes the utilization of available spectrum and leads to improved efficiency and reduced spectrum scarcity.

The real-time dynamic exchange of spectrum allotments through sub-leasing and micro-leasing introduces market-driven mechanisms to spectrum allocation. Lessees can negotiate and trade spectrum rights based on demand, allowing for more efficient allocation and ensuring that spectrum goes to entities that value it the most. Market dynamics and competition incentivize efficient spectrum utilization and encourage innovation in services and applications.

Sub-leasing and micro-leasing enable lessees to adapt their spectrum holdings to meet evolving demands and emerging technologies. Lessees can adjust their spectrum portfolios based on specific time frames, geographical areas, or application requirements, optimizing spectrum allocation for different use cases. The ability to have dynamic responsiveness to changing demands ensures that spectrum resources are allocated where they are most needed, enhancing overall network performance and user experience.

The real-time, dynamic exchange of spectrum allotments also simplifies the administrative process compared to traditional status spectrum allocation systems. Rather than undergoing lengthy license transfers or reassignments, lessees can efficiently sub-lease or micro-lease spectrum through streamlined contractual arrangements. This reduces administrative burdens, fosters system agility, and promotes efficient spectrum management.

Expanded Granularity in Spectrum Requests and Dynamic Responses to Spectrum Requests In prior systems, lessee requests were static. The original request for spectrum had finite parameters that could not be changed after the initial request was made. This lack of flexibility led to underutilization or inefficient use of spectrum resources as well as reduced quality during usage. With static lessee requests, lessees had to guess as to what parameters would be important during time of spectrum usage. This approach led to inefficient spectrum allocation, as lessees ended up with more or less spectrum than necessary as well as inferior quality of spectrum. In a static lessee request system, lessees may be unable to return or release unused spectrum back into the pool when it is no longer needed. This lack of a mechanism to relinquish spectrum leads to spectrum wastage, where valuable resources remained unused or underutilized by lessees that did not require them.

The inability to modify lessee requests hinders effective spectrum management and responsiveness to changing demands. Static systems were challenged in optimizing spectrum allocation, balancing spectrum availability across different geographical areas or time periods, and accommodating emerging technologies or unforeseen requirements.

Lessees in a static system, experienced administrative complexities and implementation delays. Lessees had to go through lengthy processes to amend or update spectrum requirements, resulting in delays and additional administrative burdens.

The present invention solves the above-identified problems by allowing a lessee to identify granular and dynamic spectrum requirements. In response, the overall system can be dynamically optimized to meet the identified spectrum characteristics required for different applications. The system can allocate resources optimally to avoid over-provisioning or underutilization. The efficient and dynamic resource allocation improves overall spectrum utilization and maximizes the capacity of the system.

Dynamic resource allocation enables the system to adapt to changing demands and technological advancements. Granular identification of spectrum requirements allows the system to dynamically make fine-grained adjustments in allocations as needs and system utilization evolve over time. This flexibility ensures that the system remains responsive to emerging applications and changing user demands, optimizing resource utilization in real-time.

By considering both optimal and sub-optimal allocation options, the system can explore various trade-offs and balance resource allocation based on different criteria. This optimization process ensures that the allocated spectrum is used most effectively, accounting for factors such as quality of service, coverage, interference mitigation, and user requirements. It allows for a more holistic approach to spectrum management.

Granular identification of lessee spectrum requirements also enables the system to allocate resources in a manner that prioritizes quality of service. By matching the specific needs of different applications or users, the system can ensure that sufficient spectrum resources are allocated to maintain desired performance levels. This leads to improved user experiences, reduced congestion, and better overall service quality.

With granular identification of spectrum requirements, the system can support dynamic sharing arrangements and coexistence of different services and technologies. By precisely identifying the specific spectrum characteristics required by each entity, the system can facilitate efficient spectrum sharing without causing harmful interference. This enables multiple services to operate concurrently, maximizing spectrum utilization and accommodating diverse use cases.

Optimizing resource allocation based on granular identification of spectrum requirements enhances spectrum efficiency. By tailoring allocations to the unique needs of different applications or users, the system can minimize wastage and improve overall spectrum utilization. This leads to more efficient use of available spectrum resources, addressing spectrum scarcity concerns and supporting the growing demand for radio frequency spectrum usage.

The ability to granular identify spectrum requirements facilitates effective spectrum management. Regulatory authorities or system operators can gain valuable insights into the specific needs of different users and applications, enabling them to make informed decisions regarding spectrum allocation, policy development, and sustainability and optimal utilization of spectrum.

Optimizing Value Compensation

Under previously existing systems, the lessee of the spectrum obtained allocation rights at a value that was pre-determined before usage and was not given any opportunity to receive any adjustments or modifications to costs or commodity value based on the degradation quality experience. In previous systems, users were charged based solely on predicted quality. This created a mismatch between the service quality that users expected and the quality that they actually experienced. If the predicted quality did not align with actual performance, users were overcharged for the received service, which eroded trust and lead to negative user experiences.

That is, in previous systems, users ended up paying for a higher quality of service than the quality of service that was experienced during use of the allocated spectrum. When the predicted quality failed to accurately reflect the actual performance, users were charged for a service that did not meet qualifications. In a system where users are charged based on predicted quality, there were no mechanisms in place to provide refunds, credits, or adjustments in allocated spectrum to reflect the reduced quality experienced during usage. In short, when users are charged based on predicted quality, there is little to no incentive for service providers to ensure optimal resource allocation and performance. The lack of feedback through measured quality may result in a lack of accountability for delivering satisfactory service. This leads to suboptimal utilization of spectrum resources and a lower overall quality of service.

The present invention provides a system that performs dynamic billing to ensure that users are charged based on the experienced quality of service during actual usage of the allocated spectrum. By considering measured quality metrics, such as signal strength, throughput, or latency, the billing system accurately reflects the value users actually receive from the allocated spectrum. This fair and accurate billing promotes transparency, builds user trust, and ensures that users pay for the quality of service that was actually received.

By continuously monitoring and optimizing spectrum usage based on real-time measurements, the system can allocate resources more effectively. This optimization helps prevent underutilization or congestion, maximizes spectrum efficiency, and ensures that users receive the best possible quality of service within the available spectrum resources.

Dynamic billing and system optimization provide flexibility to adapt to changing user demands and network conditions. The system can dynamically adjust resource allocation based on real-time measurements and user requirements. This flexibility enables the efficient use of spectrum resources, accommodates varying traffic patterns, and allows for the introduction of new services or technologies as needed.

By optimizing resource allocation and considering real-time measurements, dynamic billing systems can drive improvements in quality of service. The system can identify areas of congestion or performance degradation and take proactive measures to address them. This leads to enhanced user experiences, reduced network congestion, and improved overall service quality.

By linking billing to quality of service metrices, service providers are motivated to invest in network infrastructure, optimize network performance, and deliver a better user experience. This promotes healthy competition, innovation, and drives overall service quality improvements in the market.

According to one aspect of the invention, a method of allocating spectrum within a radio frequency system is provided. The method includes receiving, by a spectrum optimization server from a lease management server, information associated with a request for leasing radio frequency spectrum to a first lessee, the request including a first indicator of desired quality, identifying, by the spectrum optimization server, a first allocation of spectrum for the first lessee based on the first indicator of desired quality and a predicted quality of the first allocation of spectrum, transmitting, by the spectrum optimization server, an indication that the first lessee is granted access to the first allocation of spectrum, receiving, by the spectrum optimization server from a first spectrum sensing device, information associated with at least one measured quality characteristic of the first allocation of spectrum, and transmitting, by the spectrum optimization server to the lease management server, an indication of measured quality of the first allocation of spectrum. A first commodity value associated with the first allocation of spectrum is identified based on the at least one measured quality characteristic of the first allocation of spectrum.

According to another aspect of the invention, a spectrum optimization server for allocating spectrum within a radio frequency system is provided. The spectrum optimization server including a communication interface configured to communicate over a wireless communication network, a memory, and at least one processor configured to: receive, from a lease management server via the communication interface, information associated a request for leasing radio frequency spectrum to a first lessee, the request including a first indicator of desired quality, identify a first allocation of spectrum for the first lessee based on the first indicator of desired quality and a predicted quality of the first allocation of spectrum, transmit, via the communication interface, an indication that the first lessee is granted access the first allocation of spectrum, receive, from a first spectrum sensing device via the communication interface, information associated with at least one measured quality characteristic of the first allocation of spectrum, and transmit, to the lease management server via the communication interface, an indication of measured quality of the first allocation of spectrum. A first commodity value associated with the first allocation of spectrum is identified based on the at least one measured quality characteristic of the first allocation of spectrum.

According to another aspect of the invention, a system for allocating spectrum within a radio frequency system. The system including a spectrum lease management server, a spectrum optimization server, and a plurality of spectrum sensing devices. The spectrum optimization server receives, from a lease management server via the communication interface, information associated a request for leasing radio frequency spectrum to a first lessee, the request including a first indicator of desired quality, identifies a first allocation of spectrum for the first lessee based on the first indicator of desired quality and a predicted quality of the first allocation of spectrum, transmits an indication that the first lessee is granted access the first allocation of spectrum, receives, from a first spectrum sensing device, information associated with at least one measured quality characteristic of the first allocation of spectrum, and transmits, to the lease management server, an indication of measured quality of the first allocation of spectrum. A first commodity value associated with the first allocation of spectrum is identified based on the at least one measured quality characteristic of the first allocation of spectrum.

BRIEF DESCRIPTION OF THE DRAWINGS

The accompanying drawings, which are incorporated herein and constitute a part of this specification, illustrate exemplary embodiments. Together with the general description given above and the detailed description given below, serve to explain the features of the various embodiments.

FIG. 6 is a graphical representation of identifying spectrum that is available for allocation according to an embodiment of the present disclosure.

DETAILED DESCRIPTION

Figure 1:
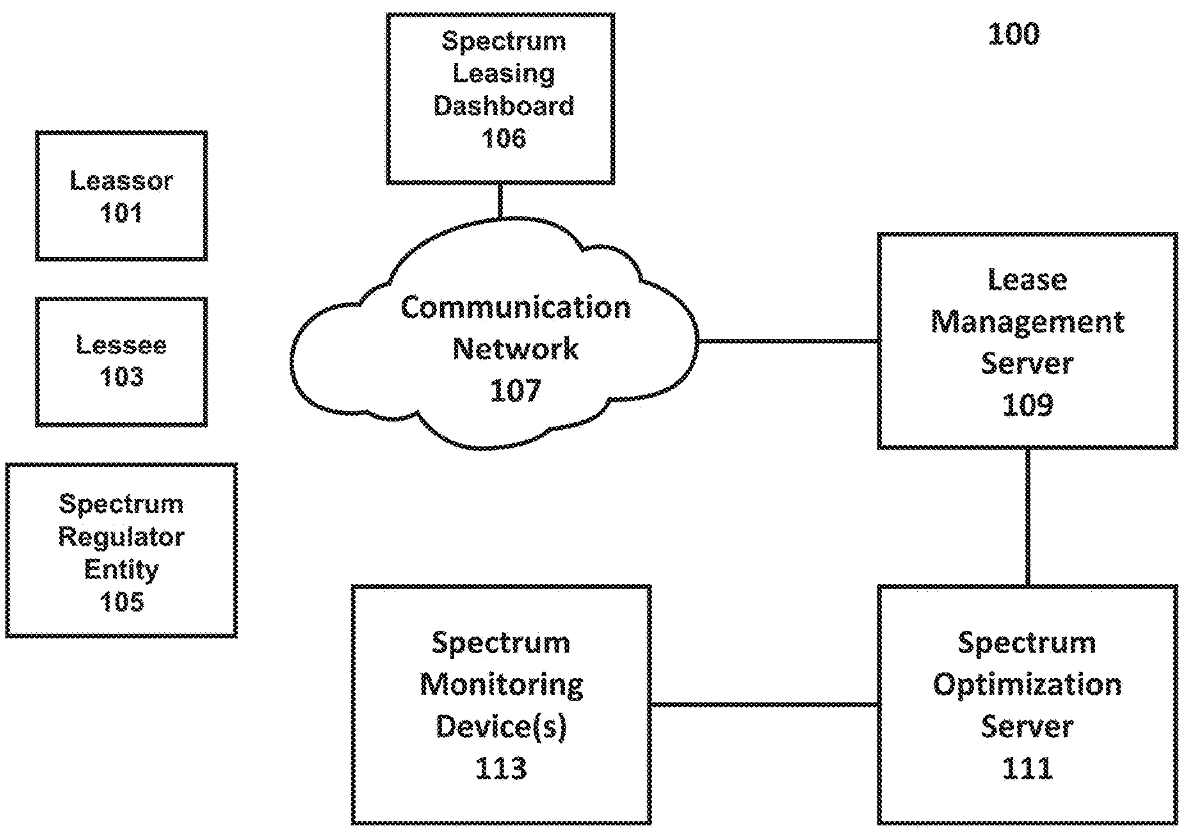
FIG. 1 is a block diagram illustrating a system for leasing radio frequency spectrum according to an embodiment of the present disclosure.

The various embodiments are described in detail with reference to the accompanying drawings. Whenever possible, the same reference numbers are used throughout the drawings to refer to the same or like parts. References made to particular examples, details, and representative materials, methods, and implementations are for illustrative purposes only, and thus do not, and are not intended to, limit the scope of the various embodiments of the claims.

The following description with reference to the accompanying figures is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

The terms “have”, “may have”, “can have,” “include”, “may include”, “can include”, “comprise”, and the like used herein indicate the existence of a corresponding feature (e.g., a number, a function, an operation, or an element) and do not exclude the existence of an additional feature.

The terms “A or B”, “at least one of A and/or B”, or “one or more of A and/or B” may include all possible combinations of items listed together. For example, the terms “A or B”, “at least one of A and B”, or “at least one of A or B” may indicate all the cases of (1) including at least one A, (2) including at least one B, and (3) including at least one A and at least one B.

The terms “first”, “second”, and the like used herein may modify various elements regardless of the order and/or priority thereof, and are used only for distinguishing one element from another element, without limiting the elements. For example, “a first element” and “a second element” may indicate different elements regardless of the order or priority. For example, without departing the scope of the present disclosure, a first element may be referred to as a second element and vice versa.

It will be understood that when a certain element (e.g., a first element) is referred to as being “operatively or communicatively coupled with/to” or “connected to” another element (e.g., a second element), the certain element may be coupled to the other element directly or via another element (e.g., a third element). However, when a certain element (e.g., a first element) is referred to as being “directly coupled” or “directly connected” to another element (e.g., a second element), there may be no intervening element (e.g., a third element) between the element and the other element.

The term “configured (or set) to” as used herein may be interchangeably used with the terms, for example, “suitable for”, “having the capacity to”, “designed to”, “adapted to”, “made to”, or “capable of”. The term “configured (or set) to” may not necessarily have the meaning of “specifically designed to”. In some cases, the term “device configured to” may indicate that the device “may perform” together with other devices or components. For example, the term “processor configured (or set) to perform A, B, and C” may represent a dedicated processor (e.g., an embedded processor) for performing a corresponding operation or a general-purpose processor (e.g., a central processing unit (CPU) or an application processor) for executing at least one software program stored in a memory device to perform a corresponding operation.

The terminology herein is only used for describing specific embodiments and is not intended to limit the scope of other embodiments. The terms of a singular form may include plural forms unless otherwise specified. The terms used herein, including technical or scientific terms, have the same meanings as understood by those of ordinary skill in the art. Terms defined in general dictionaries, among the terms used herein, may be interpreted as having meanings that are the same as, or similar to, contextual meanings defined in the related art, and should not be interpreted in an idealized or overly formal sense unless otherwise defined explicitly. Depending on the case, even the terms defined herein should not be such interpreted as to exclude various embodiments of the present disclosure.

The word “exemplary” is used herein to mean “serving as an example, instance, or illustration.” Any implementation described herein as “exemplary” is not necessarily to be construed as preferred or advantageous over other implementations.

The systems and methods for radio frequency spectrum leasing in accordance with the invention allow dynamic access of spectrum, optimizing system utilization and throughput based on a predicted quality of an allocated spectrum and a measured quality of the allocated spectrum.

The systems and methods for Spectrum Micro-Lease Management and Enforcement in accordance with the invention allow dynamic access of spectrum to existing users and new users. The system allows existing users to remain on the spectrum undisturbed while providing spectrum access to additional users. The spectrum micro-lease management and enforcement invention combines real-time spectrum monitoring spectrum availability database information to provide an optimized spectrum allocation, including rapid reallocation of spectrum assignments.

The Spectrum Micro-Lease Management and Enforcement invention provides advanced spectrum visualization, analytics and data processing for understanding the spectrum environment; a "micro-leasing" infrastructure that allows for rapid reallocation of spectrum assignments; ultra-wideband sensing and reporting for monitoring activity and ensuring compliance; advanced modeling, simulation, and automation to determine potential or active interference and propose optimal reallocation and leasing; and distributed communications, cloud storage, and web hosting infrastructure for streamlined deployment and management.

The systems and methods in accordance with the invention efficiently plan and manage spectrum access and deconflict spectrum assignments for testing, provide actionable information regarding telemetry link performance for a given flight path, implement automated sharing techniques (e.g., to enable test ranges to efficiently support required operations), and provide precision visualization of spectrum assignments and telemetry link performance.

Figure 2:
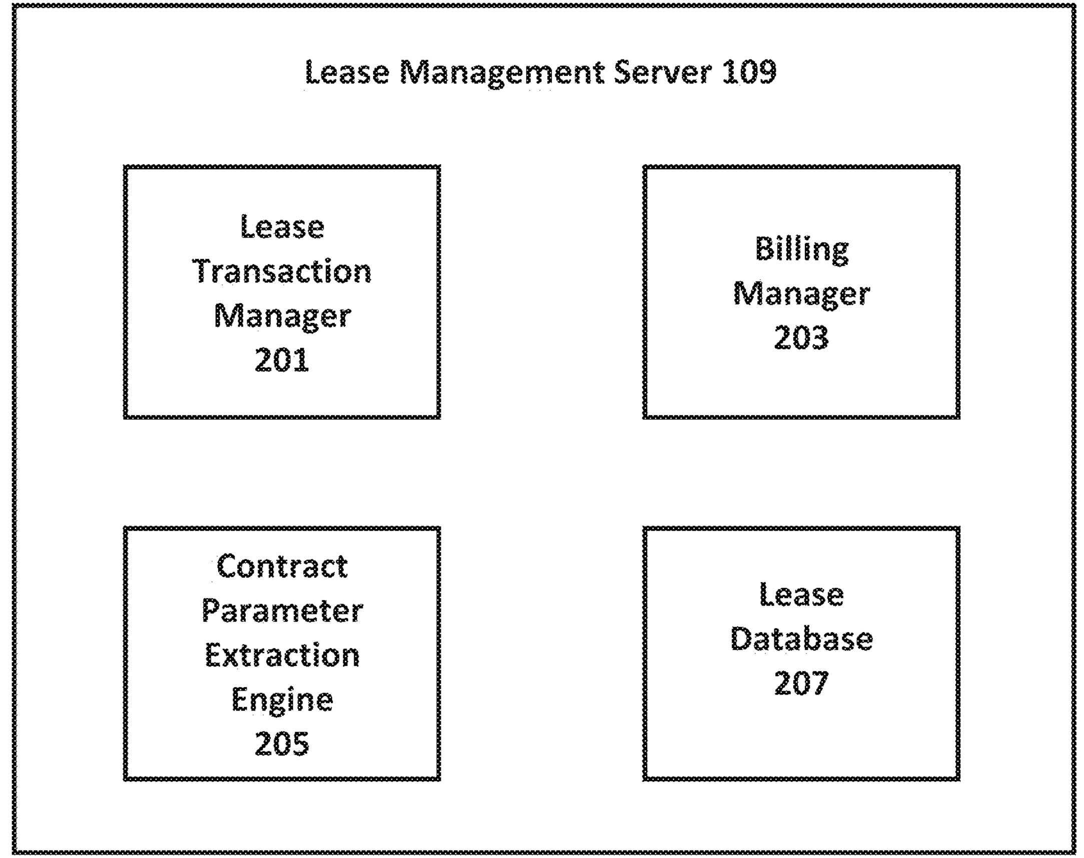
FIG. 2 is a block diagram illustrating a leasing management server according to an embodiment of the present disclosure.
Figure 3:
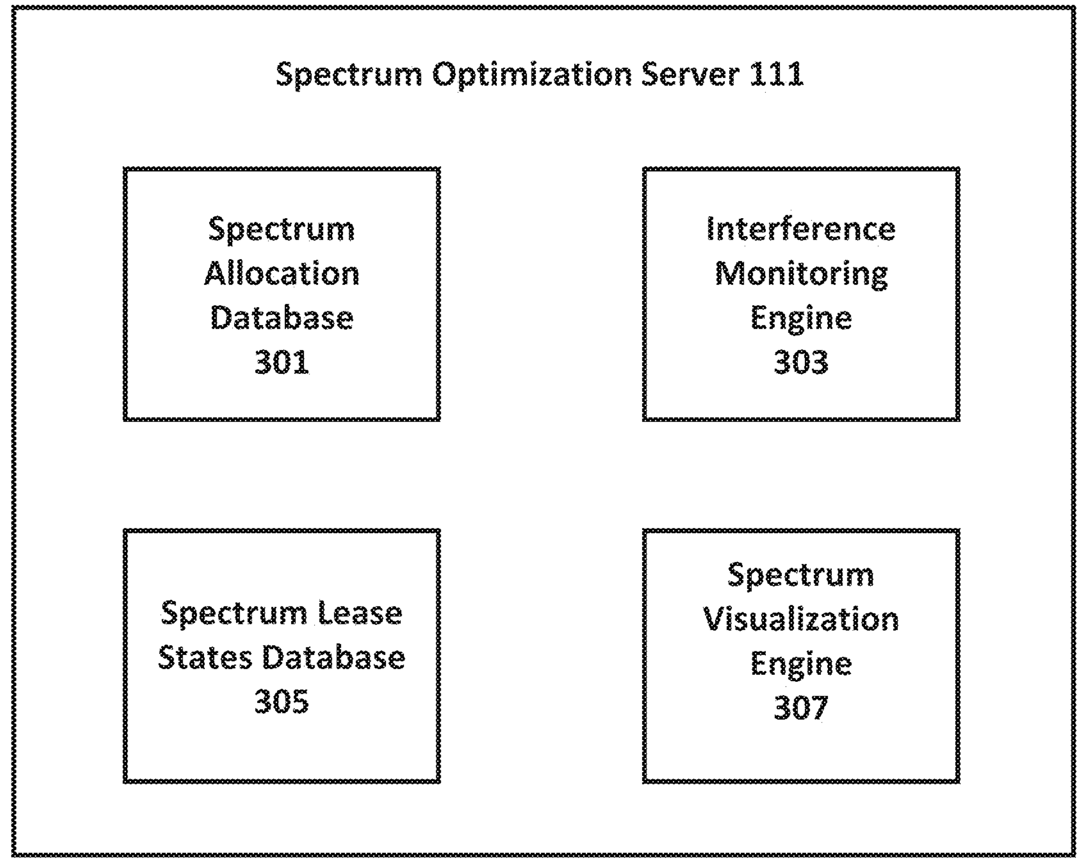
FIG. 3 is a block diagram illustrating a spectrum optimization server according to an embodiment of the present disclosure.

FIG. 1 illustrates a block diagram of a system for leasing radio frequency spectrum according to an embodiment of the present disclosure FIG. 2 illustrates a block diagram of a leasing management server according to an embodiment of the present disclosure. FIG. 3 illustrates a block diagram of a spectrum optimization server according to an embodiment of the present disclosure.

Referring to FIG. 1, system 100 includes one or more lessor devices 101, one or more lessee devices 103, an optional spectrum regulator entity 105, a spectrum leasing dashboard 106, a communication network 107, a lease management server 109, a spectrum optimization server 111, and one or more spectrum monitoring devices 113.

Spectrum

Radio frequency spectrum that is allocated for lease within system 100 may be identified by several components and each component may include one or more variables. Exemplary components of the radio frequency spectrum include time, frequency, interference, location, power, or a waveform.

The time component may be fixed or variable. It may be a time window that grants access to the spectrum within the range of times defined by the window such that the window may be short, in the magnitude of a second or even millisecond, or extended over a period of several years. The time component may have a defined start time and a defined end time. Alternatively, the time component may be dynamic and flexible based on a lessee's needs or requested quality indicators.

The frequency component may refer to a specific electromagnetic wave frequency or radio frequency to which the leased spectrum is allocated or used. The lessee may be granted the right to use specific frequency bands or channels within the spectrum for a defined period.

The interference component can refer to the presence of unwanted signals, noise, or disturbances that can disrupt or degrade the quality of communication within a given frequency band. Interference occurs when signals from different sources overlap or interact with each other, causing undesired effects on the intended signal transmission or reception. The interference component is directly related to the quality of the spectrum. That is, the lower the interference component within the spectrum, the higher the quality of the spectrum.

The location component can be a defined geographic boundary in which lessee devices are granted access to allocated spectrum. The lessee devices can transmit and receive signals within the geographic boundary. The location component can correspond to a contiguous or non-contiguous area.

The power component can be a power value limit that lessee devices cannot exceed. The power component may be fixed or variable based on optimization within the system. The power component of a signal refers to the magnitude or level of power carried by the signal. Power is a measure of the signal's energy or intensity, and it plays a crucial role in determining the signal's strength and ability to propagate over a given distance as well as impact on interference with respect to another portion of spectrum.

The waveform component may correspond to different characteristics or properties of a signal, such as frequency, amplitude, phase, or duration which contribute to the resulting shape of the transmitted wave.

In an exemplary embodiment, the exemplary components of the radio frequency spectrum may be defined in Institute of Electrical and Electronics Engineers (IEEE) 1900.5.2, which is incorporated by reference in its entirety.

Lessor

A lessor 101 can be an entity that has the authority to lease spectrum to another entity by granting the other entity access to the spectrum associated with the lessor. The granting of the right to use the spectrum may be a temporary permission to use the spectrum such that the lessor maintains exclusive rights to the spectrum. In an exemplary embodiment, the lessor may be a spectrum regulator entity 105 such as government or regulation agency or an entity that has formally acquired spectrum rights from a spectrum regulator entity. In another exemplary embodiment, the lessor may have acquired designated spectrum from a spectrum regulator entity 105 and is extending spectrum rights within system 100 such that spectrum may be sub-leased or micro-leased to one or more lessees 103.

Lessee

A lessee 103 can be an entity that desires to lease spectrum. In an exemplary embodiment, the lessee 103 may use the leased spectrum to transmit or receive communications over the radio frequency system.

Spectrum Leasing Dashboard

It is noted that lessor 101, lessee 103, or spectrum regulator entity 105 may or may not be in direct communication with system 100 via the communication network 107. That is, the devices associated with the lessor 101, lessee 103, or spectrum regulator entity 105 may include wired or wireless communication interfaces configured to allow communication over the communication network 107. However, the devices associated with the lessor 101, the lessee 103, or the spectrum regulator entity 105 may not be in communication with the communication network 107. Instead, a user associated with the lessor 101, lessee 103, or spectrum regulator entity 105 may access system 100 via a spectrum leasing dashboard 106

The spectrum leasing dashboard 106 can be any type of interface that facilitates access to system 100 for lessor 101 or lessee 103. The interface of the spectrum leasing dashboard 106 may be a graphical user interface that is accessible over a communication network 107. Alternatively, the spectrum leasing dashboard 106 may be accessible through the lease management server 109 such that information corresponding to spectrum to be leased may be manually input at the lease management server 109. In an exemplary embodiment, the spectrum leasing dashboard 106 can be a remote dashboard or web-based dashboard that allows users to monitor and interact with the system remotely through a web-browser or dedicated application.

The spectrum leasing dashboard 106 can provide a centralized view of important information within the spectrum leasing system, data, or controls related to the system 100 being monitored. It allows users to access and manage the system 100 from any location with an internet connection, eliminating the need for a specific device or direct physical connection to the system.

By accessing the spectrum leasing dashboard 106, users can view real-time or near real-time data, monitor system performance, configure settings, initiate actions, and receive notifications or alerts. The dashboard may provide visualizations, graphs, charts, or other means to present information in a clear and organized manner, enabling users to make informed decisions and perform necessary tasks.

The spectrum leasing dashboard 106 can offer convenience, accessibility, and flexibility by enabling users to interact with the system 100 from virtually anywhere using a compatible web browser or application, without the need for physical proximity to the system or a dedicated device.

Lease Management Server

A lease management server 109 can be configured to perform an oversight role within system 100 as well as act as the interface between the lessor 101, lessee 103, or spectrum regulator entity 105. In an exemplary embodiment, the lease management server 109 can facilitate leasing operations, ensure smooth coordination between the lessor 101, lessee 103, or spectrum regulator entity 105, or maintain compliance with regulations and policies.

The lease management server 109 can facilitate the negotiation and establishment of lease agreements between spectrum owners (lessors 101) and lessees 103. This involves defining the terms, conditions, and duration of the lease, as well as specifying the allocated spectrum bands, usage rights, and any associated fees or charges.

The lease management server 109 can communicate requirements identified by the lessees 103 to the spectrum optimization server 111. That is, lessee 103 can provide spectrum requirements to the lease management server 109, which can then extract the relevant information to provide to the spectrum optimization server 111.

The lease management server 109 can monitor the leased spectrum to ensure lessees 103 comply with the terms and conditions of the lease agreements. This includes verifying proper spectrum usage, monitoring power levels, interference mitigation, and adherence to regulatory requirements. The lease management server 109 may employ monitoring tools, perform periodic audits, and address any violations or non-compliance issues. In an exemplary embodiment, the lease management server 109 can coordinate with regulatory authorities, if necessary, to adhere to spectrum regulations and polices.

The lease management server 109 can facilitate lease modifications with lessors 101, lessees 103, or spectrum regulation entities 105 when necessary, such as changes in allocated spectrum bands, lease duration, or usage terms. The lease management server 109 can also manage lease renewals, working with both lessors 101 and lessees 103 to extend or modify lease agreements as per the mutual agreement.

The lease management server 109 can handle billing and payment processes, ensuring accurate invoicing of lease fees or charges based on the agreed terms. The lease management server 109 can track usage, calculate fees, generate invoices, manage payment collections and distributions. The lease management server 109 also can integrate with financial systems and coordinate with billing departments associated with lessors 101 or lessees 103. In an exemplary embodiment, the lease management server 109 can identify a commodity value associated with the spectrum usage such that in addition to fiscal value, the lease management server 109 can calculate a corresponding commodity value of using the spectrum such that if the quality of the measured spectrum is less than the predicted quality of the allocated spectrum, the lease management server 109 can create a "credit" such that a lessee 103 can request usage of spectrum based on the commodity value credit.

In cases where conflicts or disputes arise between lessors 101 and lessees 103, the lease management server 109 can be configured to act as a mediator to resolve issues and maintain a harmonious leasing environment. The lease management server 109 can propose finding mutually acceptable solutions, addressing concerns, and facilitating effective communication between the parties involved.

The lease management server can maintain comprehensive records, documentation, and reports related to the leasing activities between lessors 101, lessees 103, or spectrum regulator entities 105. This includes lease agreements, lease terms, usage data, compliance records, billing information, and other relevant documentation. These records are crucial for audits, regulatory compliance, and providing transparency to stakeholders.

By performing these functions, the lease management server 109 ensures the effective and equitable allocation of spectrum resources, adherence to lease agreements, and efficient management of the leasing process within a spectrum lease allocation system.

In an exemplary embodiment, the lease management server 109 can be configured to allow for a variety of leasing models to support legacy, emerging, and future systems. The lease management server 109 in accordance with the invention can be configured to support various environments using a similar technology base, for example Government-only, mixed Government/Contractor, mixed Government/Commercial, and solely Commercial environments.

Although the overall leasing infrastructure is discussed in detail below, it is relevant to note at this time that the "billing" depicted in this overview can be monetary or non-monetary. U.S. Government organizations and activities can be allotted "spectrum credits" (that are equivalent to spectrum assignments). These credits can be sold, "sub-leased", or given to event participants (e.g., government, industry, commercial, foreign interests, and other participants). Credits can be accumulated in preparation for future events, for risk mitigation/management, or for other reasons, and can also be given back to the spectrum authority (e.g., due to event cancellation, lack of need, or change in plans).

The lease management server 109 can work on behalf of the actual spectrum owners and can include government, industry, commercial, foreign interests, and the amount of credits (or funds) billed to the spectrum user may be computed based on the time, space, frequency (and frequency demand), bandwidth, and level of interference (or lack thereof) predicted or measured. The invention can include "spectrum monetary and exchange" systems and the infrastructure and processes through which leases are managed, costed, and revoked.

Referring to FIG. 2, in an exemplary embodiment, the lease management server 109 can include a lease transaction manager 201, a billing manager 203, a contract parameter extraction engine 205, and a lease database 207.

Lease Transaction Manager

The lease transaction manager 201 is configured to facilitate and oversee initial lease negotiations for lessees 103. The lease transaction manager 201 can receive lease requests from lessors 101 to provide spectrum to be leased within system 100 or lease requests from lessees 103 to request use of a spectrum allocation within system 100. The lease transaction manager 201 can manage the entire process of leasing spectrum, ensuring smooth and efficient interactions that occur to optimize spectrum utilization and quality throughout system 100.

In an exemplary embodiment, the lease transaction manager 201 can facilitate the negotiation process between lessors 101 and lessees 103. The lease transaction manager 201 can receive from the lessors 101 or the lessees 103 information to define the terms and conditions of the lease, including lease duration, allocated spectrum bandwidth, pricing, or any other relevant contractual obligations. The lease transaction manager 201 can further negotiate terms between parties to ensure that an acceptable agreement for the lease transaction is reached.

The lease transaction manager 201 can be responsible for registering and documenting lease agreements. That is, agreements between lessors 101 and the system 100 or agreements between lessees 103 and the system 101. The lease transaction manager 201 can be configured to maintain a comprehensive database of lease contracts, capturing all the relevant details such as lease start and end dates, leased spectrum characteristics, associated fees, or any specific provisions, restrictions, or characterizations. Proper documentation ensures transparency, accountability, and legal compliance throughout the lease transaction.

Based on the agreed terms, the lease transaction manager 201 can allocate and assign the specific spectrum bands to lessees 103. In an exemplary embodiment, the lease transaction manager 201 can allocate and assign specific spectrum bands based on terms of the lease agreements (individual or collectively throughout the system), spectrum quality, interference, network throughput or utilization, etc. In addition, the lease transaction manager 201 can ensure that the allocated spectrum does not interfere with other existing allocations and adheres to regulatory guidelines. The lease transaction manager 201 can keep track of the allocated spectrum assignments, avoiding any overlapping or conflicting lease agreements.

Once a lease is in effect, the lease transaction manager 201 can continuously monitor the usage of the leased spectrum. The lease transaction manager 201 can verify that lessees adhere to the allocated frequency bands, power limits, or any other relevant operating parameters. The lease transaction manager can detect, record, and address any instances of non-compliance or unauthorized usage, ensuring proper enforcement of lease agreements and regulatory requirements.

As lease contracts approach their expiration dates, the lease transaction manager 201 can facilitate the renewal process. In an exemplary embodiment, the lease transaction manager 201 can monitor the lease contracts for end dates and can initiate coordination to determine whether parties wish to negotiate new terms, update documentation, or extend the lease duration if desired. In cases where leases are terminated prematurely, the lease transaction manager 201 is configured to ensure that proper handling of the termination process, including any required notifications, return of spectrum rights, or resolution of financial obligations are performed.

Billing Manager

Billing manager 203 can be configured to handle the financial aspects of the lease transactions. Billing manager 203 can manage the billing and payment processes, ensuring accurate invoicing based on the agreed pricing structure, lease duration, and real-time quality of allocated spectrum. The billing manager 203 can track and reconcile financial transactions related to each lease, providing transparency and facilitating financial settlements between the parties involved as well as a mechanism to modify billing based on the difference between projected quality of spectrum and real-time measurements of the allocation of spectrum during usage.

Contract Parameter Extraction Engine

The contract parameter extraction engine 205 can extract the parameters from each of the leases. The contract parameter extraction engine 205 can provide the extracted parameters to the spectrum optimization server 111. In an exemplary embodiment, the spectrum optimization server 111 can optimize utilization and quality of spectrum allocation based on the parameters extracted from the leases by the contract parameter extraction engine 205.

Lease Database

Information corresponding to each lease with each lessor 101, lessee 103, or spectrum regulator entity 105 can be stored in the lease database 207. In an exemplary embodiment, the full record of each lease can be stored in the lease database 207 of the lease management server 109. In contrast, the parameters necessary to perform optimization decisions in the spectrum optimization server 111 are transmitted to the spectrum optimization server. That is, device and network resources (e.g., power, processing, bandwidth, etc.) can be minimized by extracting and transmitting only the relevant parameters needed for spectrum optimization to the spectrum optimization server 111 such that the full data record of the lease is stored and maintained at the device that receives the lease information.

In an exemplary embodiment, a lessee can define one or more of the following parameters of a lease: space, time, spectrum, use requirement/need, desired/required quality, optimal/critical thresholds, or user equipment characteristics (or representations thereof to assure IP/privacy protection.

Based on the above-identified parameters, the spectrum optimalization server 111 can assign allocations, identify cost associated with spectrum allocation usages, project quality, identify caveats or risks, or identify alternative allocations.

Spectrum Optimization Server

Spectrum optimization server 111 can be configured to optimize the allocation and utilization of spectrum resources to maximize throughput and utilization of system 100 as well as maximize quality of the allocated spectrum. Spectrum optimization server 111 can implement various algorithms, techniques, or optimization strategies to maximize the efficiency and effectiveness of spectrum allocation.

The spectrum optimization server 111 can be configured to analyze the available spectrum resources, including frequency bands, bandwidth, or availability. The spectrum optimization server 111 can gather information about spectrum occupancy, interference levels, signal propagation characteristics, or regulatory constraints. This analysis can provide a foundation for effective spectrum allocation and optimization.

The spectrum optimization server 111 can assess the spectrum requirements and demands from different lessees 103 or users. It considers factors such as bandwidth needs, quality of service (QoS) requirements, geographical coverage, traffic patterns, or priority levels. By identifying the demand requirements identified by lessees 103, the spectrum optimization server 111 can make informed decisions for allocating spectrum resources.

Based on the analysis of available spectrum and demand assessment, the spectrum optimization server 111 can determine the optimal allocation of spectrum resources to lessees 103. It considers factors such as frequency bands, channel assignments, power levels, or interference constraints. The spectrum optimization server 111 can be configured to maximize spectrum utilization, minimize interference, or meet the quality and capacity requirements of the lessees.

The spectrum optimization server 111 can be configured to enable dynamic spectrum access, allowing for real-time adjustments and optimization of spectrum allocation based on changing conditions. In an exemplary embodiment, the changing conditions can be conditions within the system 100 (e.g., network, throughput, quality of spectrum, etc.) or they could be changing environmental conditions including weather, interference, or rouge devices. The spectrum optimization server 111 can dynamically reassign spectrum resources, change channel assignments, adjust power levels, or adapt to varying demand patterns. This dynamic access helps optimize spectrum utilization and accommodate evolving requirements.

The spectrum optimization server 111 can employ interference management techniques to mitigate interference among different spectrum allocations. Factors such as coexistence rules, interference thresholds, and interference avoidance strategies can be considered when determining whether to maintain or change spectrum allocations. By effectively managing interference, the spectrum optimization server 111 can ensure that allocated spectrum resources maintain desired quality levels and minimize disruptions.

The spectrum optimization server 111 considers Quality of Server (QoS) requirements of the lessees 103 and aims to optimize the overall QoS for all users. It considers metrics such as signal strength, data rates, latency, reliability, or coverage. By optimizing the spectrum allocation and access, the spectrum optimization server 111 maximizes and optimizes the QoS experience for the lessees 103 and users.

The spectrum optimization server 111 continuously monitors the performance of the spectrum allocation, lessee utilization, and system conditions. It collects real-time data, including signal measurements, traffic patterns, or interference levels. Based on this information, the spectrum optimization server 111 makes decisions that adapts and optimize the spectrum allocation dynamically within system 100 to maintain optimal performance.

The spectrum optimization server 111 can generate reports, statistics, or analysis of spectrum allocation and utilization. In an exemplary embodiment, the spectrum optimization server 111 can provide insights into spectrum usage patterns, efficiency metrics, interference levels, or overall system performance. These reports help evaluate the effectiveness of the spectrum allocation system and making informed decisions for future optimization.

The information gleaned by advanced visualization techniques and systems of the invention provides a thorough understanding of the spectrum environment.

The invention uses that understanding to provide well-defined and accurate means to identify and to communicate how each device or system is using spectrum resources in a particular environment or situation and use that information to make rational decisions regarding the possible use of the spectrum. With this information, the invention accesses the spectrum data marketplace. The spectrum data marketplace is an online transactional location that facilitates the buying and selling of spectrum. The spectrum data marketplace receives and stores live observations of spectrum that are made available for analysis and use in various ways. This data may include reference information such as spectrum plans and equipment parameters, as well as spectrum data that provide a "real world awareness" of spectrum for determining patterns of life and interference patterns and occurrences. The marketplace also includes other advanced analytic subsystems that inform the "pricing" models for the leasing infrastructure and also the predictive basis for allocating spectrum assignments.

The invention optimizes spectrum sharing and allocation by identifying available (use) options within the spectrum data marketplace and proposing the best reallocation of spectrum based on consumption modeling, quality of service, admission rates, costs, and other transaction factors. In this fashion, the systems and methods of the invention ensure efficient management of the spectrum both technically and economically to optimize spectrum sharing and allocation.

The systems and methods of the invention optimize the allocation of spectrum in part by providing improved automation of spectrum access through the use of distributed, secure, transaction-based leasing. The invention incorporates the enhanced modeling of likely or potential interference to determine a "cost" for such leases. This cost information can then be used when evaluating the marketplace options for spectrum. The cost information can be further validated during operations to adjust "pricing" and "billing" for leases. The cost and pricing and billing and other monetary constructs can include transfers of currency and monies as well as the exchange of credits and debits and costs to/from the lessor.

This spectrum data marketplace approach greatly enhances the use of available spectrum as compared to the rigorous, highly structured, and manual processes of conventional systems used today to file for spectrum access with recognized authorities. Current systems and processes require excessive amounts of time (e.g., days, weeks, months) versus the much shorter timeframes accomplished by the systems and methods in accordance with the invention (e.g., microseconds, seconds, minutes). These systems and methods tackle the inadequacies of prior efforts and create exponentially more efficient and effective use of this limited physical resource over current systems and methods.

The spectrum optimization server 111 can implement advanced algorithms to analyze active leases, smart contracts, requested/unfulfilled leases, available spectra for lease/use, and a costing model. It identifies potential leasing arrangements that align with the optimization objectives, including spectrum utilization, cost reduction, lease fulfillment, or quality optimization.

The spectrum optimization server 111 can consider i.) existing lease agreements and associated smart contracts to understand the current spectrum allocation landscape, ii.) pending lease requests and unfulfilled lease requirements to address spectrum demand, iii.) information about the available spectra that can be leased or used by lessees, and iv.) a comprehensive costing model to evaluate the financial aspects and minimize costs for lessees during the leasing process.

The spectrum optimization server 111 can generate allocation and lease recommendations or identify possibilities based on these provided inputs. These recommendations outline the most suitable leasing arrangements, considering the prioritized goals of spectrum utilization, cost minimization, lease fulfillment, or quality optimization.

The spectrum optimization server 111 can make informed decisions by determining priorities among competing criteria such as spectrum utilization, cost, quality, or coverage. It employs intelligent algorithms to weigh these factors and make optimal decisions for leasing arrangements. In an exemplary embodiment, the weight of the factors can be identified by the lessee 103 when requesting allocated spectrum.

The spectrum optimization server 111 can rely on various data sources for its operation, including a Spectrum Allocation Database containing information about available spectra, a Costing Model for financial evaluation, and Interference/Quality Monitoring mechanisms to ensure optimal quality across all leases.

In an exemplary embodiment, the spectrum optimization server 111 can optimize spectrum allocation (and/or determine costs) based on one or more of demand (i.e., number of lease requests for the same spectra), availability (i.e., impact to other leases if reallocation is required), provided/available quality, desired/required space, time, spectrum (area/power, duration/density, waveform/density, required quality), support for dynamic reassignment/reallocation (or not), or potential for interference with other leases (risk).

Referring to FIG. 3, the spectrum optimization server 111 can include a spectrum allocation database 301, an interference monitoring engine 303, a spectrum lease states database 305, and spectrum visualization engine 307.

RF Emissions Topology Engine

In an exemplary embodiment, the spectrum optimization server 111 may further include an RF emissions topology engine (not illustrated). The RF emissions topology engine may be configured to fuse and compute the best guess of current and future RF emission states across all areas (time or spectra) that are or may be managed by the system. It can create a "fill in the dots picture" of the multi-dimensional RF environment.

In an exemplary embodiment, data from emitters, weather, terrain, or environment may be provided to the RF emissions topology engine. The RF emissions topology engine may provide information regarding temporal, special, spectral (frequency, waveform, phase densities, and power levels). The RF emissions topology engine may use information from one or more of Spectrum Data Repository, National Oceanic and Atmospheric Administration (NOAA), Digital Terrain Data, National Aeronautics and Space Administration (NASA) (ionospheric soundings), etc. to determine current and future RF emission states across the system 100.

Spectrum Identification/Location Service

System 100 may further include a spectrum identification/location service (not illustrated). The spectrum identification/location service can be configured to identify and locate emitters in the environment. In addition, the spectrum identification/location server may validate the existence/location/activities of emitters in the environment.

In an exemplary embodiment, the spectrum identification/location service can identify planned emitters, active lease parameters (space, time, spectrum), or survey/raw sensor data from spectrum monitoring device(s) 113. The spectrum identification/location service can provide information associated with spectrum activity and participant locations and emissions to the spectrum optimization server 111 to be considered in any optimization determination.

The spectrum identification/location service can compare observations of projected/predicted spectrum qualities, identify spectrum utilization in space/time/spectrum for comparison to active identification/characterization, geolocation of emissions through lines of bearing (LOBs), time/frequency/phase difference of arrival computation across sensor array, etc. The spectrum identification/location service can receive information from digitization of observed spectrum from the spectrum monitoring device(s) 113.

Spectrum Allocation Database

After the spectrum optimization server 111 identifies how the spectrum is to be allocated to the lessees 103 within the system 100, the identified spectrum can be stored in the spectrum allocation database 301 to correlate with the specific lessee 103 in order to assist in system optimization and utilization as well as billing. In an exemplary embodiment, the spectrum optimization server 111 can determine whether to initiate system optimization based on the information stored in the spectrum allocation database 301. In addition, historical data associated with measured interference or quality values may be stored in the spectrum allocation database 301 to facilitate a determination of predicted quality for a specific spectrum allocation.

Interference Monitoring Engine

The interference monitoring engine 303 may be in communication with the spectrum monitoring device(s) 113. That is, the output of the spectrum monitoring device(s) 113 may be in communication with the interference monitoring engine 303 to facilitate real-time detection of interference of spectrum allocations. In an exemplary embodiment, when the interference monitoring engine 303 identifies that a current interference detection no longer meets a predetermined threshold, the interference monitoring engine 303 can send a notification to the processor of the spectrum optimization server to initiate optimization within the system 100 in order to maintain the desired quality identified by a lessee 103 in the lease.

In an exemplary embodiment, the interference monitoring engine 303 can be configured to monitor a perceived and/or a predated interference/signal quality experienced or expected for all of the spectra being managed within the system 100. The interference monitoring engine 303 may receive information related to a spectrum lease smart contract, information from radio frequency emissions topology engine including optimal and critical quality thresholds used to determine whether interference is detected. The interference monitoring engine 303 can provide a computed current or future interference/signal quality of a receiver (or representative of same) holding or potentially holding the specified lease.

In an exemplary embodiment, the interference monitoring engine 303 can be configured to dynamically compute current or future interference/signal quality. The interference monitoring engine 303 may implement algorithms that incorporate frequency, coverage, RF emissions topology (i.e., power over time/space) of active or predicted emissions, polarization/orientation, waveform/density, environmental noise, received sensitivity, receiver bandwidth, receiver antenna characteristics, etc.

Spectrum Lease States Database

After receiving parameters of the leases extracted by the lease management server 109, the parameters are stored in the spectrum lease states database 305 to allow the spectrum optimization server 111 to access the information necessary to make dynamic real time system optimization decisions without having to retrieve the data from another device, thereby minimizing resource usage (e.g., power, processing, bandwidth, etc.) within the spectrum optimization server 111.

In an exemplary embodiment, the spectrum lease states database 305 can further store a lease type identifier or lease hierarchy identifier. Exemplary lease types include a static lease, dynamic lease, time lease, spatial lease, spectral lease, exclusive lease, or shared lease. The spectrum optimization server 111 can further use the lease types to optimize spectrum allocation as well as throughput and dynamic optimization of the overall system.

Spectrum Visualization Engine

The spectrum visualization engine 307 can be configured to receive information associated with at least one of available spectra, active leases, current costs, or outstanding/pending lease requests. Based on the received information, the spectrum visualization engine 307 can render a display of the current market state of the spectrum allocation and usage across all the managed spectra (i.e., spectra for which the exchange has been granted leasing authority) or a visual representation of which spectra is available, which spectra is leased (and to whom at what cost), what cost is predicted for available spectra (to be requested or bid upon), or current lease requests that are unfulfilled (and why). In an exemplary embodiment, the information rendered by the spectrum visualization engine can be displayed on a display and made available to consumers to facilitate trust in the exchange (i.e., like the New York Stock Exchange (NYSE) stock trackers.

In an exemplary embodiment, the data used to create the spectrum visualization can be stored in the Spectrum Data Repository and the Spectrum Allocation Database such that the spectrum visualization engine 307 retrieves the data dynamically and as needed.

The advanced spectrum visualization engine 307 of the invention can integrate precise knowledge of emitter locations, active emissions, and performance to provide precision knowledge of the spectrum environment. The invention provides advanced spectrum visualization using ultra-wideband sensing, reporting, and advanced modeling. The invention implements automated planning and persistent real-time monitoring and visualization of spectrum allocations and utilization, as well as computation and display of telemetry link performance across the range environment (for example, along aircraft flight paths). The systems leverage existing link performance computations from existing product sets such as Merlin, Sandbar (a DIA-developed product), and the Spectrum Consumption Model (SCM) to compute and display link performance over areas of operation, along flight paths, and along ground routes. The modeling and computations are backed up by real-time reporting from the links under observation (such as Link-16, for example). The system creates and displays planned and measured spectrum coverage maps such as waterfall plots, spectral traces, and other spectrum visualization graphics. The invention provides immersive spectrum visualizations including various advanced spectral, temporal, and spatial depictions of the environment.

Spectrum visualization, analytics, and data processing includes a wide array of spectrum sensor and system integration, sensor data ingest and analysis, and tactical and operational thick- and thin-client visualization and control applications across a wide array of customers and agencies. These customers and agencies include the DOD and the Intelligence Community (IC), including groups of intelligence agencies and subordinate organizations that work separately and together to support security policies. Ultra-wideband sensing and reporting systems and methods of the invention incorporate unprecedented sensor systems instantaneously that cover tens of gigahertz of spectrum. These systems include not only power sampling but also direction-finding and geolocation of emitters across these ultrawide bandwidths. The invention also incorporates a storage cloud environment for these systems.

The advanced spectrum visualization systems of the invention combine meticulous knowledge of emitter sites, active emissions, and performance to provide precision understanding of the spectrum environment. Regarding emitter locations, the systems and methods of the invention use a combination of cooperative and non-cooperative location techniques (e.g., PLI reporting on Link-16, precision geolocation of emissions by sensor systems, ingest of flights plans and other route and airspace definitions) to precisely display the location of spectrum participants (in near real-time) and to identify emissions coming from unplanned locations or from other participants (e.g., civilian infringement, accidental emissions, intentional interference). Knowledge of active emissions is gleaned through pervasive and continuous sensing of the entire bandwidth being utilized, all potential interfering emissions, and the location of those emissions in space, time, and spectrum. The invention provides unprecedented near real-time understanding of all emissions occurring across the test range environment. Complete knowledge of what emitters SHOULD be operating when/where/how combined with complete knowledge of what emitters ARE operating when/where/how combined with an understanding of where/when/how interference occurs is the underpinning for constructing the compliance regime needed to support the micro-leasing exchange discussed in detail below. Also, through a combination of cooperative and non-cooperative information ingest, the invention has a precise knowledge of (link) performance and can show a true picture across the test range environment. Consuming data from the communications links being utilized (e.g., Link-16 and other tactical data link networks) provides actual link performance across the tactical network. Combining real reporting from the communications systems with link-performance modeling and simulation provides an accurate picture of overall RF network performance across the event.

Interference and propagation modeling and simulation systems of the invention build on the extensive suite of models and capabilities of existing spectrum operations including intelligence derived from electronic signals and systems used by foreign targets, such as communications systems, radars, and weapons systems, such as SIGINT, for example. In addition, the systems and methods of the invention augment previous suites of government and commercial codes to predict electromagnetic field propagation over a wide range of conditions, environments, and frequencies. The invention also provides enhanced modeling of spectrum consumption, including capabilities beyond the IEEE 1900.5.2 "Standard Method for Modeling Spectrum Consumption" (a.k.a. "Spectrum Consumption Model," or "SCM," which is incorporated by reference in its entirety). For example, the spectrum consumption models of the invention include "spectrum masks" that provide a robust determination of interference likelihood, including enhanced features such as waveform, duty cycle, power maps (i.e., directionality), intermodulations, frequency images, platform features, and other complex aspects of signal interference modeling.

The advanced modeling, simulation, and automation system provides immersive spectrum visualizations including advanced spectral, temporal, and spatial depictions of the environment. These depictions show areas of likely interference, times when spectrum sharing is limited or inhibited by environmental or other factors, and depictions of spectrum "maneuver spaces" through which spectrum participants can freely move/maneuver without causing interference with the current allocations. The advanced spectrum visualization determines and presents potential or active interference as well as propagation models, both of which can be used to propose optimal reallocation and leasing. The interference and propagation modeling can be used in simulations and to create automations to further visualize the spectrum. With these techniques, the invention creates an inter-networking of spectrum management and availability awareness across distributed test ranges and environments across the United States (and beyond). The pervasive, ultra-wide bandwidth spectrum sensors, reporting, and visualizations in accordance with the invention deliver complete availability awareness and an assured mechanism for managing spectrum leases and costs.

Spectrum Monitoring Device(s)

Referring to FIG. 1, system 100 further includes one or more spectrum monitoring devices 113. System 100 can include any number of spectrum monitoring devices 113. The spectrum monitoring devices 113 can be disposed throughout the system 100 or at critical locations where interference is expected to be high.

The spectrum monitoring device(s) 113 are configured to sense real-time information about the radio frequency spectrum. This information may be used for utilization, availability, or allocation of radio frequency spectrum within system 100. These sensors are designed to detect, analyze, or monitor the electromagnetic spectrum, enabling efficient spectrum allocation and management. The spectrum monitoring devices 113 may be any sensor capable of performing real-time detection of radio frequency including a spectrum sniffer, an Ultra-Wideband (UWB) spectrum sensor, or any sensor capable of signal identification and location.

In an exemplary embodiment, "spectrum sniffers" are spectrum monitoring devices or software tools that passively monitor the electromagnetic spectrum to identify and capture radio frequency signals. They operate by scanning a wide frequency range and analyzing the captured signals to extract information such as signal strength, frequency, modulation type, or communication protocol used. Spectrum sniffers can provide information that allow the spectrum optimization server 111 to identify insights into the utilization of spectrum bands and help identify unused or underutilized frequencies in order to provide the most robust optimization throughout the system 100.

In another exemplary embodiment, UWB sensors can be used in system 100. UBW sensors can detect and analyze signals across a broad frequency range. UWB sensors are capable of monitoring a wide spectrum bandwidth, typically spanning several gigahertz. They are designed to detect both licensed and unlicensed signals, including short-range wireless communication systems, radar systems, and other devices operating in UWB frequency bands. UWB spectrum sensing provides valuable information for spectrum allocation systems by identifying available spectrum resources and minimizing interference between different systems.

In another exemplary embodiment, signal identification and location sensors can be implemented within system 100. Signal identification and location sensors can be specifically designed to perform signal identification and location functions. They can accurately identify and classify different types of signals based on their waveform characteristics, modulation schemes, or other signal parameters. Signal identification sensors can provide detailed information about the types of signals present in a given frequency band. They enable efficient spectrum management by facilitating the identification of interference sources, illegal transmissions, or unauthorized use of spectrum resources. Additionally, signal location sensors can determine the geographical location of a signal source, aiding in the enforcement of spectrum regulations and ensuring proper utilization of allocated frequencies.

System 100 can include any or all of the above-discussed various types of spectrum monitoring devices 113 in any combination. That is, the spectrum monitoring devices 113 can all be the same throughout system 100 or a combination of the different types of spectrum monitoring devices 113 can be deployed throughout system 100. Selection of the type of spectrum monitoring device 113 can be based on various parameters including location, anticipated interference, or physical environment variability.

In an exemplary embodiment, in addition to providing enhanced planning, access, visualization, and implementation of spectrum sharing, the invention monitors the spectrum using spectrum monitoring devices 113 and reporting systems. The monitoring activities ensure that proposed usage is effectively implemented and that it complies with legal, contractual, market-based, or operational guidelines. Historical archives of spectrum plans and activities are used to analyze actual use of the micro-lease infrastructure and to perform compliance monitoring.

The outputs of the spectrum monitoring devices 113 can be used to evaluate and determine spectrum utilization, mediate access to spectrum, or identify opportunities for micro-lease spectrum allocation. Monitoring compliance ensures minimal interference between users and optimization of spectrum usage with respect to capacity, number of services, allocation, or other operational metrics. Increased (optimized) spectrum usage can lead to more interference, and the monitoring systems ensure that users follow technical parameters, as well as economical, legal, political, and social constraints. The system-monitoring servers identify spectrum interference and can be used for future approval or revocation of spectrum access, including micro-licenses, as well as for ensuring that the spectrum delivers what the lessor was expecting. Systems for spectrum monitoring acquire signals from a reference antenna or downlink, analyze the shape (or mask) of the acquired signals, and compare the mask of the acquired signals to a reference mask or power level to determine compliance.

In addition to the comparisons made to ensure compliance, the invention provides additional productivity enhancements and signal analysis insights, including short duration or intermittent irregular events. The systems of the invention record and synchronize slow motion playback of these events across multiple channels and push the notifications to operators where they can be logged and further analyzed to identify interference sources.

The invention also provides access to real-time streaming signal data with no acquisition dead time. In practice, this permits signal analysis in the frequency/spectral domain and also in the time, modulation, and joint time-frequency domains. A wide range of analysis capabilities and signal insights are available with signals captured as raw data series, rather than conventional frequency domain snapshots.

Real-Time Sharing Infrastructure

Armed with the spectrum data marketplace data and proposed optimal reallocation modeling and costing, the systems and methods of the invention utilize a real-time spectrum sharing infrastructure to identify spectrum micro-leases, subleases, and other reallocation vehicles that may provide or approximate the optimal reallocation proposed and/or the utilization needed. The infrastructure extends existing proscriptive spectrum management approaches to "sub-lease" licensed spectrum, to reallocate (in near-real time) spectrum resources, and to provide incentives for spectrum sharing and disincentives for spectrum interference while simultaneously incorporating unprecedented sensing and visualization of the entire spectrum. The micro-leasing infrastructure allows for allocation and assignment of spectrum "slots" in near-real time (i.e., for spectrum participants that are capable of interacting on that level) and supports legacy, static assignment types for equipment that are not capable of participating in this "spectrum exchange." The micro-leasing infrastructure of the invention provides a complete solution stack for automated sharing of spectrum in an a priori and in-event manner.

This "micro-leasing" infrastructure can be implemented in a distributed computing environment that supports simultaneous operations across networked test ranges and sites. The infrastructure allows for rapid reallocation of spectrum assignments and improved automation of spectrum access through the use of distributed, secure, transaction-based leasing. The invention provides the ability to "sub-lease" owned spectrum for generating revenue and/or for facilitating more efficient use of that spectrum by multiple parties. The access, cost, and capabilities of the spectrum determined by the enhanced modeling can be validated during operations to adjust "pricing" and "billing" for leases. As outlined above, the cost and pricing and billing and other monetary constructs can include transfers of currency and monies as well as the exchange of credits and debits and costs to/from the lessor.

Banking and other transaction-based industries are moving toward stronger encryption, identity and authentication, and transaction security and tracking technologies (e.g., Blockchain). The features of the spectrum exchange lease transaction-based system of the invention incorporate such additional core constructs. For example, cryptographic keys form the basis for some blockchain and secure transaction systems. The systems of the invention use cryptographic hashes to track the "blocks" in the transaction and to form the basis of keys public/private key pairs that aid in identity verification and access control.

Additionally, confirming the identity of and understanding what organization, individual, or system is making the spectrum request (or providing the approval for subleasing their spectrum) and being able to validate that identity is critically important. The invention uses a variety of mechanisms for assuring identity, including centralized or distributed certificate authorities. The method by which certificates and identity are assigned to spectrum participants may be performed through proxy, an a priori assignment, or through dynamic assignment in the field.

Further, a distributed ledger is used for verification of pre-transaction availability and ownership, as well as for management of the lease transaction (if approved and verified), automated execution of a lease contract, and execution of credit/fund servicing. The systems of the invention extend verification capabilities of existing companies by providing distributed ledger technologies for these markets.

The application of cryptographically based blocks and a distributed ledger system establishes trust in the recorded blocks and provides the definitional benefits of a blockchain where "any given block cannot be altered retroactively without alteration of all subsequent blocks, which requires consensus of the network majority." These methods of assuring access control, transaction protection, and security of data at rest and in motion facilitate trust in the overall micro-leasing process and capabilities, which eventually leads to implementation, compliance, and dependence over time. By establishing this trust in the technical solution, full adherence to these emerging capabilities becomes routine.

As outlined above, the systems and methods of the invention implement automated sharing techniques that allow for planned and real-time visualization of allocations and utilization and compares computed performance plans to actual reallocation. While automated identification and selection is heavily leveraged for ease of use and maximization of optimization opportunities, the systems allow for manual operations and overrides to ensure continuity of operations.

The micro-leasing infrastructure provides a platform to act upon the analyzed, identified, and proposed additional optimization opportunities, and it can incorporate usage patterns across events, locations, and time. The systems and methods of the invention incorporate system maneuver spaces, which define the volume over which a particular computed solution remains valid from both the perspective of the "protecting" or "performing" system as well as for the "protected" or "passive" platform. These maneuver spaces can be defined from the perspective of the protecting platform that is concerned with determining the volume over which the protecting platform's current kinetic, non-kinetic, or sensor solution remains valid. They also can be defined from the perspective of the protected entity platform that is concerned with determining the volume within which the protected entity must remain for the support being provided me to remain valid. (See U.S. Pat. No. 9,846,223, which is incorporated by reference in its entirety.) The maneuver spaces define and help visualize—in space, time, and spectrum—where a specific use of spectrum will or will not cause interference, depending on the focus. The multi-dimensional bounds of the maneuver space define where and when those bounds of non-interference (or interference) will occur, thus defining the "trigger conditions" under which penalty, re-allocation, or lease termination is required.

The systems and methods of the invention compute the maneuver spaces through a sequence of computing the acceptability regions for a spectrum use/request and then computing a capability region based on the performance capabilities of the system/platform on which the spectrum user resides (i.e., aircraft). Finally, the system interconnects those capability regions over time and spectrum to determine the resulting five-dimensional construct. These spaces can be summed, intersected, compared, and measured to support a number of manual, visual, and automated decision aids.

The maneuver spaces can be computed for every assignment and for every lease request and provide predictive analytics to support proactive deconfliction of spectrum use as well as computation, assessment, and prediction of spectrum performance. Optimization solutions allow for reuse of spectrum through time and space and can include modulation compatibility (within each time, space, and frequency "bin") and power shaping and control (for directional apertures and receivers). The maneuver space also can be used to predict when interference is likely to occur (for assignment/lease validation/acceptance), to predict link performance along an aircraft flight path, and to aid in optimization of allocations. Additionally, the multi-dimensional "size" of the maneuver space can be used to aid in the determination of "cost" for the assignment/lease.

The infrastructure of the invention provides a spectrum "micro-leasing" marketplace that can be managed much like a stock exchange allowing for "sale" and "purchase" of spectrum "slots" and for "billing" the lessee based on the likelihood of interference with other spectrum users. The lease infrastructure manages requests, validation, approval, monitoring, revocation, and costs aspects of the micro-leasing.

The charges to spectrum participants for leasing, sub-leasing, and maintaining cost accounts (e.g., added credits, subtracted lease charges, and resulting balances) must be defined and presented clearly and objectively so that lease costs will be equitable, fair, and easily understood. The systems and methods of the invention are flexible and can be adapted to different cost structures. For example, a cost-based pricing model may be used to determine charges and credits. Alternatively, if prices diverge from an aggregate market rate, the micro-leasing infrastructure of the invention can easily pivot to a market-based pricing model. One goal of the overall system is to disincentivize interference that causes inefficient use of spectrum resources, so a number of pricing factors are incorporated into the costing methodology for the leases and a number of different currencies can be used (e.g., using non-monetary credits, using real money, or other options like cryptocurrency) In the examples of the invention discussed below, the infrastructure is normalized in terms of "credits," which are simply representative of "spectrum costs" and can be allocated, distributed, revoked, or saved for gaining access to spectrum.

One exemplary micro-leasing infrastructure determines the price of spectrum access by extending the multi-dimensional maneuver space construct outlined above to represent a volume of spectrum use, the size of which determines overall cost. The spatial, temporal, and spectral size of the assignment all expand the volume that represents cost. Holding a lease longer, having an assignment that covers larger physical areas, and having assignments that cover a larger frequency bandwidth and use waveforms that are non-interoperable all cause loss of access to other spectrum participants. To minimize loss of access, therefore, the maneuver space cost basis creates disincentives for holding long-term leases, covering larger-than-needed areas, and using interfering waveforms over large bandwidths.

In all cases, the invention provides assured mechanisms for managing leases and credits/costs while incentivizing utilization of non-interfering waveforms, times, locations, and power levels to create an environment where spectrum owners facilitate greater access and utilization of their licenses and generate real revenue from those licenses.

Spectrum Monitoring

In addition to providing enhanced planning, access, visualization, and implementation of spectrum sharing, the invention monitors the spectrum using ultra-wideband sensing and reporting systems. The monitoring activities ensure that proposed usage is effectively implemented and that it complies with legal, contractual, market-based, and operational guidelines. Historical archives of spectrum plans and activities are used to analyze actual use of the micro-lease infrastructure and to perform compliance monitoring.

The systems monitor the use of the micro-lease infrastructure to evaluate and determine spectrum utilization and to mediate access to spectrum. Monitoring compliance ensures minimal interference between users and optimization of spectrum usage with respect to capacity, number of services, allocation, and other operational metrics. Increased (optimized) spectrum usage can lead to more interference, and the monitoring systems ensure that users follow technical parameters, as well as economical, legal, political, and social constraints. The system-monitoring servers identify spectrum interference and can be used for future approval or revocation of spectrum access, including micro-licenses, as well as for ensuring that the spectrum delivers what the lessor was expecting. Systems for spectrum monitoring acquire signals from a reference antenna or downlink, analyze the shape (or mask) of the acquired signals, and compare the mask of the acquired signals to a reference mask or power level to determine compliance.

In addition to making comparisons to ensure compliance, the invention provides additional productivity enhancements and signal analysis insights, including short duration or intermittent irregular events. The systems of the invention record and synchronize slow motion playback of these events across multiple channels and push the notifications to operators where they can be logged and further analyzed to identify interference sources.

The invention also provides access to real-time streaming signal data with no acquisition dead time. In practice, this permits signal analysis in the frequency/spectral domain and also in the time, modulation, and joint time-frequency domains. A wide range of analysis capabilities and signal insights are available with signals captured as raw data series, rather than conventional frequency domain snapshots.

Data Management

The invention includes distributed communications, cloud storage, and web hosting infrastructure for streamlined deployment and data management. The invention provides a data access and management layer for traditional and non-traditional spectrum information sources. The systems utilize existing and emerging spectrum management and frequency assignment tools, including Spectrum XXI, the Joint Spectrum Data Repository (JSDR), and related databases such as JSC Equipment Tactical and Space (JETS), Background Environment Information (BEI), and other spectrum databases that collect, standardize, and distribute spectrum-related data. The data management systems of the invention also draw from sources such as the Federal Communications Commission (FCC), the International Telecommunications Union (ITU), and other open-source information. Further, the systems and methods of the invention pull in relevant information from NSA's E-Space, DIA's Modernized Intelligence Database (MIDB), Link-16 (for real-time data), organic sensor arrays (as available), and other military and intelligence sources. The data management systems of the invention import and incorporate data from legacy systems such as the Spectrum Planning Engineering and Evaluation Device (SPEED) and the Coalition Joint Spectrum Management and Planning Tool (CJSMPT) in addition to manual user inputs.

The systems and methods of the invention provide a historical archive of spectrum plans and activities to support analysis of additional optimization opportunities, to understand usage patterns across events, locations, and time, and to inform predictive analytics that support proactive deconfliction of spectrum use and prediction of different RF channel performance as well as other optimizations. As outlined above, optimization solutions allow for reuse of spectrum through time and space and consider modulation compatibility, power shaping, and control.

The invention includes an integrated network system of analytics platforms for collection, transmission, storage, and processing of spectrum usage and management data. Using these analytics, a balance can be achieved between spectrum shortage and spectrum under-utilization while minimizing interference and disorder. The distributed communications platform highlights spectrum data analytics in examining spectrum sensing, spectrum data statistical inference and knowledge discovery, spectrum data-driven decision optimization, and spectrum experiment validation and evaluation to identify and address critical spectrum issues.

The systems and methods for spectrum micro-lease management and enforcement in accordance with the invention extend capabilities of prior systems with advanced spectrum visualization, spectrum allocation optimization, real-time sharing infrastructure, spectrum monitoring, and data management.

Signal Diagram

Figure 4:
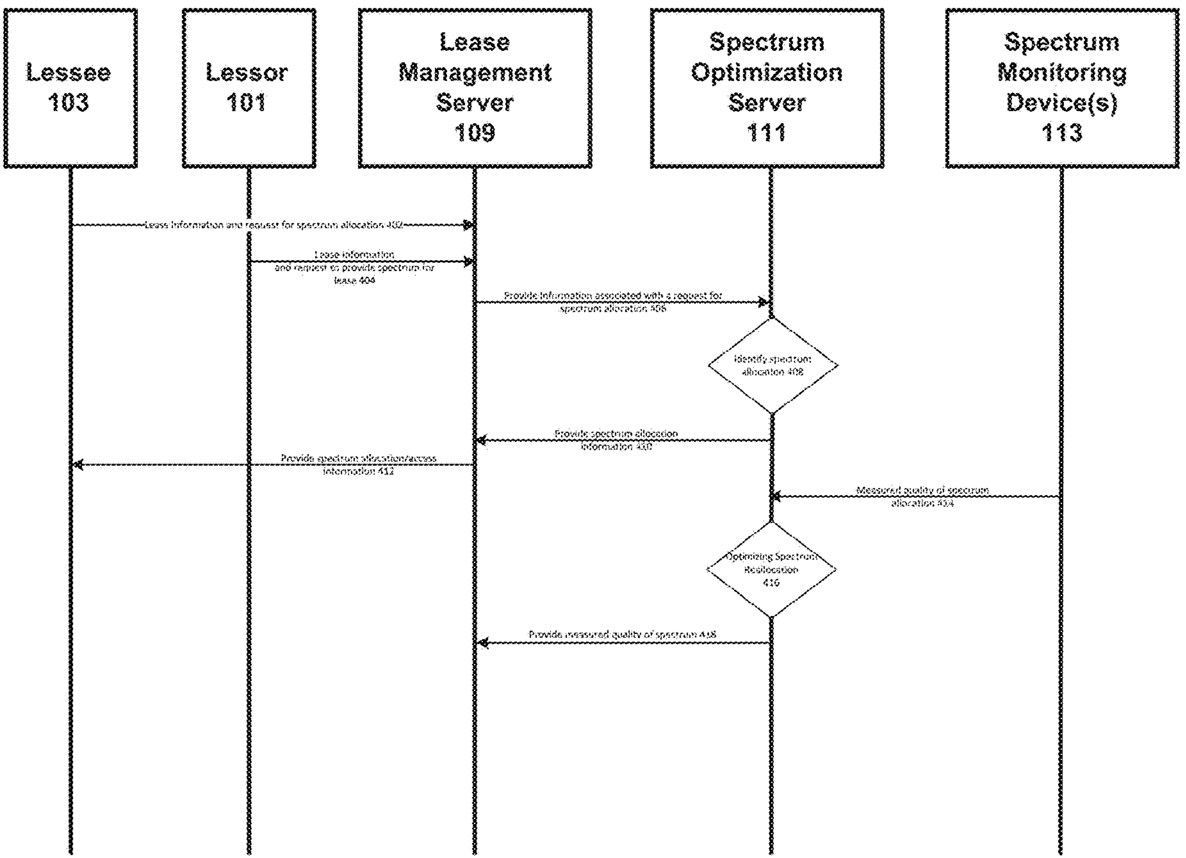
FIG. 4 is a signal diagram illustrating a method of leasing radio frequency spectrum according to an embodiment of the present disclosure.

FIG. 4 is a signal diagram illustrating a method of leasing radio frequency spectrum according to an embodiment of the present disclosure.

Referring to FIG. 4, a lessee 103 can transmit, to the lease management server 109, lease information and a request for spectrum allocation at 402. The lease information (e.g., information that would allow the lessee 103 to lease an allocation of spectrum) and the request for spectrum allocation can be in the same or different messages. At 404, a lessor 101 can transmit, to the lease management server 109, lease information (e.g., information that would allow the system 100 to use spectrum associated with the lessor 101 to allocate spectrum to one or more lessees). While messages 402 and 404 are illustrated in a particular order, messages 402 and 404 can be transmitted in any order. That is, the message 404 from lessor 101 may be transmitted before message 402 is transmitted from lessee 103.

While only one lessor 101 and one lessee 103 are illustrated in FIG. 4, system 100 may include any number of lessors 101 and lessees 103. That is, when the system 100 includes a plurality of lessors 101, the spectrum associated with each of the lessors are combined and aggregated such that spectrum allocations can be selected from the pooled resources. In an exemplary embodiment, one lessee 103 could be assigned resources corresponding to a single lessor 101 or the allocated spectrum could be a continuous quantum that is combined from several different lessors 101. In addition, system 100 can include a plurality of lessees 103 such that the assignment of resources are performed for each lessee 103.

At 406, the lease management server 109 can provide information associated with a request for spectrum allocation. In an exemplary embodiment, message 406 can include information associated with a lessee 103 or a lessor 101. At 408, the spectrum optimization server 111 can identify a spectrum allocation based on a predicted quality of the spectrum. The spectrum optimization server 111 can provide spectrum allocation information at 410 to the lease management server 109. That is, the information provided in message 410 can allow a lessee 103 to access an identified spectrum allocation. At 412, the leasing management server 109 can provide the information for allocating or accessing spectrum to the lessee 103 such that the lessee 103 can use the information to access the specific spectrum allocated to the lessee 103.

At 414, one or more of the spectrum monitoring device(s) 113 transmits information associated with a measured quality of the spectrum allocated to the lessee 103. In 416, the spectrum optimization server 111 determines whether reallocation of the spectrum is necessary based on the measured quality of the allocated spectrum. In 418, the spectrum optimization server 111 can provide, to the lease management server 109, information associated with the measured quality of spectrum.

A determination of whether to optimize spectrum or reallocate spectrum may be performed based on a plurality of different characteristics. In an exemplary embodiment, spectrum optimization can be performed at predetermined time intervals, when a threshold amount of spectrum has been allocated, or dynamically based on a trigger throughout the system (e.g., throughput, interference, etc.).

In an exemplary embodiment, the lease management server 109 may use the information associated with the measured quality of spectrum to determine a cost associated with using the spectrum.

Method of Allocating Spectrum

Figure 5:
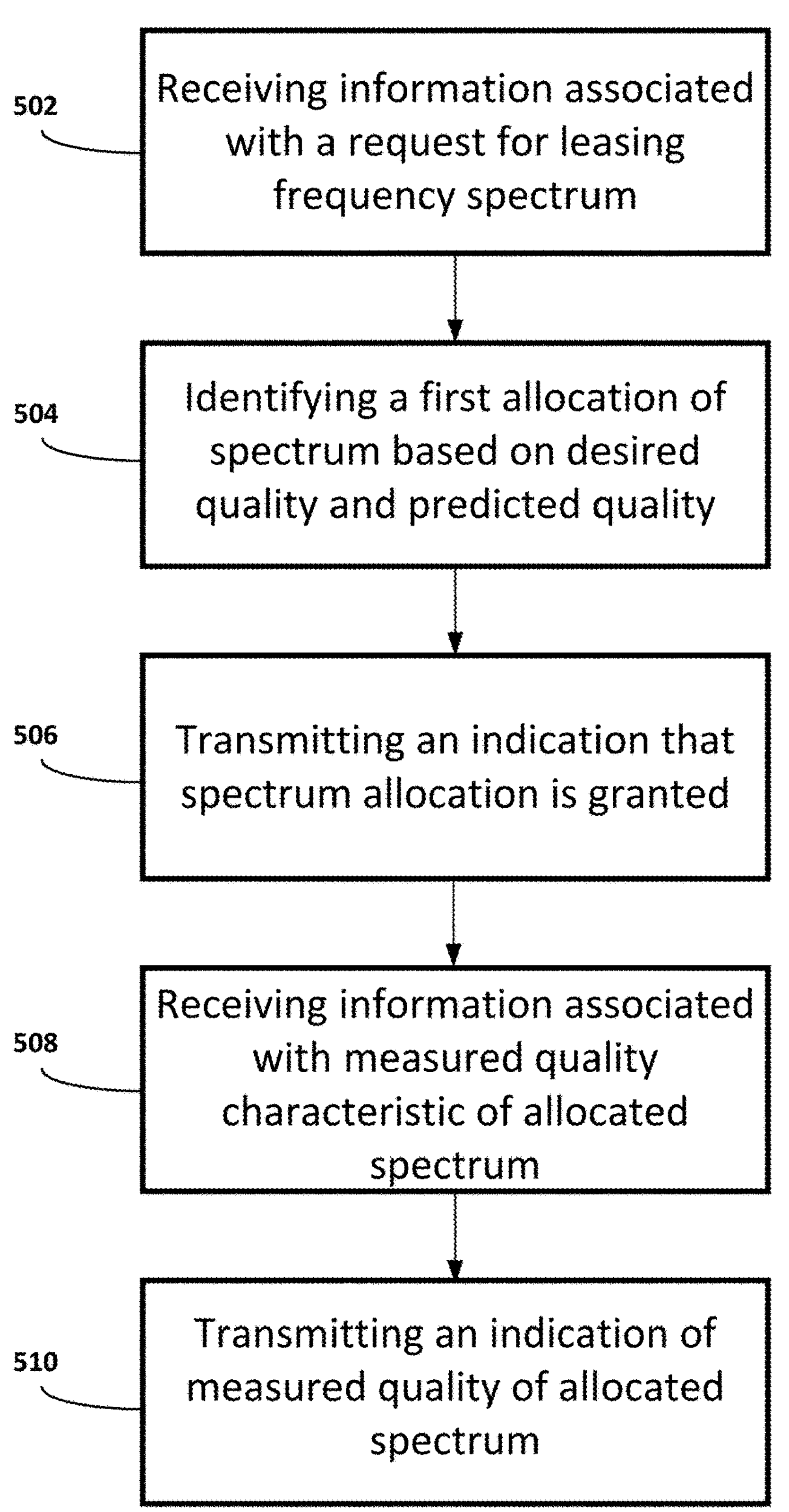
FIG. 5 is a flowchart illustrating a method of leasing radio frequency spectrum according to an embodiment of the present disclosure.

FIG. 5 is a flowchart illustrating a method of leasing radio frequency spectrum according to an embodiment of the present disclosure.

Referring to FIG. 5, method 500 is a method for allocating spectrum in a radio frequency system. In 502, information associated with a request for leasing frequency spectrum is received. In an exemplary embodiment, a spectrum optimization server can receive the information associated with a request for leasing radio frequency spectrum from a lease management server. The request may be associated with a first lessee and may include an indicator of desired quality.

In 504, a first allocation of spectrum based on the first indicator of desired quality and predicted quality for the first allocation of spectrum may be identified. In an exemplary embodiment, the spectrum optimization server can identify the first allocation spectrum based on an indicator of desired quality and predicted quality of the first allocation of spectrum.

In 506, an indication that the lessee is granted access to a first allocation of spectrum is transmitted. In an exemplary embodiment, the spectrum optimization server transmits the indication that the first lessee is granted access to the first allocation of spectrum.

In 508, information associated with at least one measured quality characteristic of the first allocation of spectrum is received. In an exemplary embodiment, the spectrum optimization server receives the information associated with the measured quality characteristic from a first spectrum sensing device.

In 510, an indication of measure quality of the first allocation of spectrum can be transmitted. In an exemplary embodiment, the spectrum optimization server can transmit the indication of measured quality of the first allocation of spectrum to the lease management server.

In an exemplary embodiment, a first commodity value associated with the first allocation of spectrum can be identified based on the at least one measured quality characteristic of the first allocation of spectrum.

FIG. 6 is a graphical representation of identifying spectrum that is available for allocation according to an embodiment of the present disclosure.

In an exemplary embodiment, the graphical representation of FIG. 6 illustrates how the spectrum optimization server 111 defines various options for spectrum allocation in response to a lease request. Specifically, the amount of spectrum with respect to interference, time, and frequency is plotted and ranked based on a value corresponding to the use of a plurality of spectrum quantum or a predefined amount of spectrum. As illustrated in FIG. 6, the spectrum optimization server 111 has identified three different spectrum quantum and has ranked them according to low, medium, and high cost. A selection of the identified spectrum is based on the parameters defined by the lessee 103 within the lease contract.

The sample real time cost visualization can be the cost of all of the spectrum within the system 100. That is, all spectrum allocations for all lessees is compiled within a single visualization rather than for a single lessee/interaction.

The exemplary systems and methods described herein can be performed under the control of a processing system including one or more processors executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples of accomplishing a more general goal that also may be accomplished in another way. Those skilled in the art will appreciate that the features described above can be combined in various ways to form multiple variations of the invention.

The invention claimed is:

1. A method of allocating spectrum within a radio frequency system, the method comprising:

receiving, by a spectrum optimization server from a lease management server, information associated with a request for leasing radio frequency spectrum to a first lessee, the request including a first indicator of desired quality;

identifying, by the spectrum optimization server, a first allocation of spectrum for the first lessee based on the first indicator of desired quality and a predicted quality of the first allocation of spectrum;

transmitting, by the spectrum optimization server, an indication that the first lessee is granted access to the first allocation of spectrum;

receiving, by the spectrum optimization server from a first spectrum sensing device, information associated with at least one measured quality characteristic of the first allocation of spectrum;

transmitting, by the spectrum optimization server to the lease management server, an indication of measured quality of the first allocation of spectrum;

identifying, by the lease management server, a first commodity value associated with the first allocation of spectrum based on the at least one measured quality characteristic of the first allocation of spectrum;

comparing, by the lease management server, the measured quality of the first allocation of spectrum to the predicted quality of the first allocation of spectrum; and creating, by the lease management server, a first commodity value credit for the first lessee if the measured quality of the first allocation of spectrum is less than the predicted quality of the first allocation of spectrum.

2. The method of claim 1, further comprising:

identifying, by the spectrum optimization server, at least one of information associated with all available spectra, information associated with active leases, information associated with current costs, information associated with pending lease requests, or information associated with real-time statuses of all managed spectra, wherein the first allocation of spectrum for the first lessee is further based on the at least one of information associated with all available spectra, information associated with active leases, current costs, pending lease requests, or real-time status across all the managed spectra.

3. The method of claim 1, further comprising:

identifying, by the spectrum optimization server, interference information used to determine the predicted quality of the first allocation of the spectrum, wherein the information to determine the predicted quality of the first allocation of spectrum includes information associated with a current signal quality or information associated with a calculated future signal quality.

4. The method of claim 1, wherein the request for leasing radio frequency spectrum to the first lessee further includes at least one of information associated with location, information associated with a time to use spectrum, information associated with use requirements, information associated with quality characteristics, or user equipment characteristics.

5. The method of claim 1, further comprising:

identifying, by the spectrum optimization server, that optimization within the radio frequency system is available;

identifying, by the spectrum optimization server, a second allocation of spectrum for the first lessee based on the identification that optimization is available within the radio frequency system;

transmitting, by the spectrum optimization server, an indication that the first lessee is granted access to the second allocation of spectrum;

receiving, by the spectrum optimization server from a second spectrum sensing device, information associated with at least one measured quality characteristic of the second allocation of spectrum;

transmitting, by the spectrum optimization server to the lease management server, an indication of measured quality of the second allocation of spectrum;

identifying, by the lease management server, a second commodity value associated with the second allocation of spectrum based on the at least one measured quality characteristic of the second allocation of spectrum;

comparing, by the lease management server, the measured quality of the second allocation of spectrum to a predicted quality of the second allocation of spectrum; and creating, by the lease management server, a second commodity value credit for the first lessee if the measured quality of the second allocation of spectrum is less than the predicted quality of the second allocation of spectrum.

6. The method of claim 5, wherein the identification that the optimization within the radio frequency system is available is based on at least one of a change in quality of the first allocation of spectrum, a change in cost for using the first allocation of spectrum, adding one or more spectrums capable of being leased, or an optimization of overall system operation.

7. The method of claim 1, further comprising:
receiving, by the spectrum optimization server from the lease management server, information associated a request for leasing radio frequency spectrum to a second lessee, the request including a second indicator of desired quality;
identifying, by the spectrum optimization server, a third allocation of spectrum for the second lessee based on the second indicator of desired quality and a predicted quality of the third allocation of spectrum;
transmitting, by the spectrum optimization server, an indication that the second lessee is granted access to the third allocation of spectrum;
receiving, by the spectrum optimization server from a third spectrum sensing device, information associated with at least one measured quality characteristic of the third allocation of spectrum;
transmitting, by the spectrum optimization server to the lease management server, an indication of measured quality of the third allocation of spectrum;
identifying, by the lease management server, a third commodity value associated with the third allocation of spectrum based on the at least one measured quality characteristic of the third allocation of spectrum;
comparing, by the lease management server, the measured quality of the third allocation of spectrum to the predicted quality of the third allocation of spectrum; and
creating, by the lease management server, a third commodity value credit for the second lessee if the measured quality of the third allocation of spectrum is less than the predicted quality of the third allocation of spectrum.

8. A system for allocating spectrum within a radio frequency system, the system comprising:
a lease management server;
a spectrum optimization server; and
a plurality of spectrum sensing devices,
wherein the spectrum optimization server is configured to:
receive, from the lease management server via a communication interface, information associated with a request for leasing radio frequency spectrum to a first lessee, the request including a first indicator of desired quality,
identify a first allocation of spectrum for the first lessee based on the first indicator of desired quality and a predicted quality of the first allocation of spectrum,
transmit an indication that the first lessee is granted access to the first allocation of spectrum,
receive, from a first spectrum sensing device, information associated with at least one measured quality characteristic of the first allocation of spectrum, and
transmit, to the lease management server, an indication of measured quality of the first allocation of spectrum, and
wherein the lease management server is configured to:
identify a first commodity value associated with the first allocation of spectrum based on the at least one measured quality characteristic of the first allocation of spectrum,
compare the measured quality of the first allocation of spectrum to the predicted quality of the first allocation of spectrum, and
create a first commodity value credit for the first lessee if the measured quality of the first allocation of spectrum is less than the predicted quality of the first allocation of spectrum.

9. The system of claim 8, wherein the spectrum optimization server is further configured to:
identify interference information used to determine the predicted quality of the first allocation of the spectrum,
wherein the information to determine the predicted quality of the first allocation of spectrum includes information associated with a current signal quality or information associated with a calculated future signal quality.

10. The system of claim 8,
wherein the spectrum optimization server is further configured to:
identify that optimization within the radio frequency system is available,
identify a second allocation of spectrum for the first lessee based on the identification that optimization is available within the radio frequency system,
transmit an indication that the first lessee is granted access to the second allocation of spectrum,
receive, from a second spectrum sensing device, information associated with at least one measured quality characteristic of the second allocation of spectrum, and
transmit, to the lease management server, an indication of measured quality of the second allocation of spectrum, and
wherein the lease management server is further configured to:
identify a second commodity value associated with the second allocation of spectrum based on the at least one measured quality characteristic of the second allocation of spectrum,
compare the measured quality of the second allocation of spectrum to a predicted quality of the second allocation of spectrum, and
create a second commodity value credit for the first lessee if the measured quality of the second allocation of spectrum is less than the predicted quality of the second allocation of spectrum.

11. The system of claim 10, wherein the identification that the optimization within the radio frequency system is available is based on at least one of a change in quality of the first allocation of spectrum, a change in cost for using the first allocation of spectrum, adding one or more spectrums capable of being leased, or an optimization of overall system operation.

12. The system of claim 8, wherein the spectrum optimization server is further configured to:
receive, from the lease management server, information associated a request for leasing radio frequency spectrum to a second lessee, the request including a second indicator of desired quality,
identify a third allocation of spectrum for the second lessee based on the second indicator of desired quality and a predicted quality of the third allocation of spectrum,
transmit an indication that the second lessee is granted access to the third allocation of spectrum,
receive, from a third spectrum sensing device, information associated with at least one measured quality characteristic of the third allocation of spectrum, and transmit, to the lease management server, an indication of measured quality of the third allocation of spectrum, and wherein the lease management server is further configured to:

identify a third commodity value associated with the third allocation of spectrum based on the at least one measured quality characteristic of the third allocation of spectrum, compare the measured quality of the third allocation of spectrum to the predicted quality of the third allocation of spectrum, and create a third commodity value credit for the second lessee if the measured quality of the third allocation of spectrum is less than the predicted quality of the third allocation of spectrum.

13. The system of claim 8, the spectrum optimization server is further configured to:

receive, from the lease management server, an indication that a first band of spectrum associated with a first lessor has been added to the system, and receive, from the lease management server, an indication that a second band of spectrum associated with a second lessor has been added to the system, wherein the first allocation of spectrum is included in the first band of spectrum or the second band of spectrum.

* * * * *